US011106308B2

(12) United States Patent
Krah et al.

(10) Patent No.: US 11,106,308 B2
(45) Date of Patent: *Aug. 31, 2021

(54) TOUCH DETECTION USING MULTIPLE SIMULTANEOUS STIMULATION SIGNALS

(71) Applicant: Apple Inc., Cupertino, CA (US)

(72) Inventors: Christoph Horst Krah, Cupertino, CA (US); Steven Porter Hotelling, Los Gatos, CA (US); Sean Erik O'Connor, Palo Alto, CA (US); Wayne Carl Westerman, Burlingame, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/989,771

(22) Filed: Aug. 10, 2020

(65) Prior Publication Data
US 2020/0371637 A1    Nov. 26, 2020

Related U.S. Application Data

(63) Continuation of application No. 15/997,541, filed on Jun. 4, 2018, now Pat. No. 10,747,355, which is a
(Continued)

(51) Int. Cl.
G06F 3/041       (2006.01)
G06F 3/044       (2006.01)

(52) U.S. Cl.
CPC .......... G06F 3/0416 (2013.01); G06F 3/041 (2013.01); G06F 3/0412 (2013.01);
(Continued)

(58) Field of Classification Search
CPC .......... G06F 3/0418; G06F 3/041; G06F 3/044–0448; G06F 3/0416–04186
(Continued)

(56) References Cited

U.S. PATENT DOCUMENTS 3,342,935 A    9/1967 Charles et al.
3,732,369 A    5/1973 Cotter
(Continued)

FOREIGN PATENT DOCUMENTS

CN    1175315 A    3/1998
CN    1254902 A    5/2000
(Continued)

OTHER PUBLICATIONS

Advisory Action received for U.S. Appl. No. 12/208,315, dated Feb. 26, 2014, 3 pages.
(Continued)

Primary Examiner — Patrick F Marinelli
(74) Attorney, Agent, or Firm — Kubota & Basol LLP

(57) ABSTRACT

The use of multiple stimulation signals having one or more frequencies and one or more phases to generate an image of touch on a touch sensor panel is disclosed. Each of a plurality of sense channels can be coupled to a column in a touch sensor panel and can have one or more mixers. Each mixer in the sense channel can utilize a circuit capable generating a demodulation frequency of a particular frequency. At each of multiple steps, various phases of one or more selected frequencies can be used to simultaneously stimulate the rows of the touch sensor panel, and the one or more mixers in each sense channel can be configured to demodulate the signal received from the column connected to each sense channel using the one or more selected frequencies. After all steps have been completed, the demodulated signals from the one or more mixers can be used in calculations to determine an image of touch for the touch sensor panel at each of the one or more frequencies.

17 Claims, 9 Drawing Sheets

Related U.S. Application Data continuation of application No. 15/250,736, filed on Aug. 29, 2016, now Pat. No. 9,990,084, which is a continuation of application No. 14/791,145, filed on Jul. 2, 2015, now Pat. No. 9,430,087, which is a continuation of application No. 14/270,147, filed on May 5, 2014, now Pat. No. 9,092,086, which is a continuation of application No. 13/916,357, filed on Jun. 12, 2013, now Pat. No. 8,754,867, which is a continuation of application No. 11/818,345, filed on Jun. 13, 2007, now Pat. No. 8,493,331.

(52) U.S. Cl.
CPC .......... *G06F 3/0418* (2013.01); *G06F 3/0445* (2019.05); *G06F 3/0446* (2019.05); *G06F 3/04166* (2019.05)

(58) Field of Classification Search
USPC .................. 345/156–184; 178/18.01–20.04
See application file for complete search history.

(56) References Cited

U.S. PATENT DOCUMENTS

| | | | |
|---|---|---|---|
| 3,767,858 | A | 10/1973 | Rodgers |
| 3,818,133 | A | 6/1974 | Cotter |
| 3,875,472 | A | 4/1975 | Schermerhorn |
| 3,886,539 | A | 5/1975 | Gould, Jr. |
| 4,071,691 | A | 1/1978 | Pepper, Jr. |
| 4,080,515 | A | 3/1978 | Anderson |
| 4,103,252 | A | 7/1978 | Bobick |
| 4,129,747 | A | 12/1978 | Pepper, Jr. |
| 4,293,734 | A | 10/1981 | Pepper, Jr. |
| 4,444,998 | A | 4/1984 | House |
| 4,550,221 | A | 10/1985 | Mabusth |
| 4,560,830 | A | 12/1985 | Perl |
| 4,680,429 | A | 7/1987 | Murdock et al. |
| 4,698,460 | A | 10/1987 | Krein et al. |
| 4,698,461 | A | 10/1987 | Meadows et al. |
| 4,733,222 | A | 3/1988 | Evans |
| 4,853,498 | A | 8/1989 | Meadows et al. |
| 4,916,308 | A | 4/1990 | Meadows |
| 4,922,061 | A | 5/1990 | Meadows et al. |
| 5,105,186 | A | 4/1992 | May |
| 5,218,174 | A | 6/1993 | Gray et al. |
| 5,270,711 | A | 12/1993 | Knapp |
| 5,305,017 | A | 4/1994 | Gerpheide |
| 5,355,149 | A | 10/1994 | Casebolt |
| 5,357,266 | A | 10/1994 | Tagawa |
| 5,475,711 | A | 12/1995 | Betts et al. |
| 5,483,261 | A | 1/1996 | Yasutake |
| 5,488,204 | A | 1/1996 | Mead et al. |
| 5,495,077 | A | 2/1996 | Miller et al. |
| 5,526,294 | A | 6/1996 | Ono et al. |
| 5,543,590 | A | 8/1996 | Gillespie et al. |
| 5,565,658 | A * | 10/1996 | Gerpheide .......... G06F 3/04182 178/18.02 |
| 5,606,346 | A | 2/1997 | Kai et al. |
| 5,621,425 | A | 4/1997 | Hoshino et al. |
| 5,634,207 | A | 5/1997 | Yamaji et al. |
| 5,650,597 | A | 7/1997 | Redmayne |
| 5,650,801 | A | 7/1997 | Higashi |
| 5,686,705 | A | 11/1997 | Conroy et al. |
| 5,691,512 | A | 11/1997 | Obi |
| 5,766,463 | A | 6/1998 | Janik et al. |
| 5,790,106 | A | 8/1998 | Hirano et al. |
| 5,790,107 | A | 8/1998 | Kasser et al. |
| 5,816,225 | A | 10/1998 | Koch et al. |
| 5,825,352 | A | 10/1998 | Bisset et al. |
| 5,831,600 | A | 11/1998 | Inoue et al. |
| 5,835,079 | A | 11/1998 | Shieh |
| 5,838,308 | A | 11/1998 | Knapp et al. |
| 5,861,583 | A | 1/1999 | Schediwy et al. |
| 5,880,411 | A | 3/1999 | Gillespie et al. |
| 5,920,309 | A * | 7/1999 | Bisset .................. G06F 3/0441 345/173 |
| 5,930,309 | A | 7/1999 | Knutson et al. |
| 5,945,980 | A | 8/1999 | Moissev et al. |
| 5,996,082 | A | 11/1999 | Cortopassi |
| 6,025,726 | A | 2/2000 | Gershenfeld et al. |
| 6,043,810 | A | 3/2000 | Kim et al. |
| 6,057,903 | A | 5/2000 | Colgan et al. |
| 6,075,520 | A | 6/2000 | Inoue et al. |
| 6,177,918 | B1 | 1/2001 | Colgan et al. |
| 6,188,391 | B1 | 2/2001 | Seely et al. |
| 6,204,897 | B1 | 3/2001 | Colgan et al. |
| 6,222,528 | B1 | 4/2001 | Gerpheide et al. |
| 6,229,856 | B1 | 5/2001 | Diab et al. |
| 6,246,729 | B1 | 6/2001 | Richardson |
| 6,310,610 | B1 | 10/2001 | Beaton et al. |
| 6,323,846 | B1 | 11/2001 | Westerman et al. |
| 6,327,011 | B2 | 12/2001 | Kim |
| 6,380,931 | B1 | 4/2002 | Gillespie et al. |
| 6,424,094 | B1 | 7/2002 | Feldman |
| 6,429,857 | B1 | 8/2002 | Masters et al. |
| 6,452,514 | B1 | 9/2002 | Philipp |
| 6,483,498 | B1 | 11/2002 | Colgan et al. |
| 6,492,979 | B1 | 12/2002 | Kent et al. |
| 6,501,529 | B1 | 12/2002 | Kurihara et al. |
| 6,559,658 | B1 | 5/2003 | Brandt |
| 6,583,676 | B2 | 6/2003 | Krah et al. |
| 6,621,484 | B1 | 9/2003 | Yee |
| 6,658,245 | B2 | 12/2003 | Li et al. |
| 6,667,740 | B2 | 12/2003 | Ely et al. |
| 6,680,448 | B2 | 1/2004 | Kawashima et al. |
| 6,690,387 | B2 | 2/2004 | Zimmerman et al. |
| 6,730,863 | B1 | 5/2004 | Gerpheide et al. |
| 6,816,750 | B1 | 11/2004 | Klaas |
| 7,015,894 | B2 | 3/2006 | Morohoshi |
| 7,030,782 | B2 | 4/2006 | Ely et al. |
| 7,031,886 | B1 | 4/2006 | Hargreaves |
| 7,042,444 | B2 | 5/2006 | Cok |
| 7,050,046 | B1 | 5/2006 | Park et al. |
| 7,129,714 | B2 | 10/2006 | Baxter |
| 7,129,935 | B2 | 10/2006 | Mackey |
| 7,129,939 | B2 | 10/2006 | Toyozawa et al. |
| 7,133,032 | B2 | 11/2006 | Cok |
| 7,184,064 | B2 | 2/2007 | Zimmerman et al. |
| 7,202,856 | B2 | 4/2007 | Cok |
| 7,230,608 | B2 | 6/2007 | Cok |
| 7,230,609 | B2 | 6/2007 | Chao et al. |
| 7,248,625 | B2 | 7/2007 | Chien |
| 7,277,087 | B2 | 10/2007 | Hill et al. |
| 7,280,167 | B2 | 10/2007 | Choi et al. |
| 7,289,142 | B2 | 10/2007 | Silverbrook |
| 7,339,499 | B2 | 3/2008 | Khlat |
| 7,362,313 | B2 | 4/2008 | Geaghan et al. |
| 7,372,455 | B2 | 5/2008 | Perski et al. |
| 7,379,054 | B2 | 5/2008 | Lee |
| 7,436,393 | B2 | 10/2008 | Hong et al. |
| 7,643,011 | B2 | 1/2010 | Oconnor et al. |
| 7,649,524 | B2 | 1/2010 | Haim et al. |
| 7,663,607 | B2 | 2/2010 | Hotelling et al. |
| 7,734,261 | B2 | 6/2010 | Bury |
| 7,812,827 | B2 | 10/2010 | Hotelling et al. |
| 7,859,522 | B2 | 12/2010 | Takahashi et al. |
| 7,876,311 | B2 * | 1/2011 | Krah .................... G06F 3/0445 345/173 |
| 7,986,193 | B2 | 7/2011 | Krah |
| 8,026,904 | B2 | 9/2011 | Westerman |
| 8,120,591 | B2 * | 2/2012 | Krah .................... G06F 3/0445 345/173 |
| 8,144,125 | B2 | 3/2012 | Peng et al. |
| 8,144,126 | B2 | 3/2012 | Wright |
| 8,175,549 | B2 | 5/2012 | Faust et al. |
| 8,232,970 | B2 | 7/2012 | Krah et al. |
| 8,237,667 | B2 | 8/2012 | Krah |
| 8,479,122 | B2 | 7/2013 | Hotelling et al. |
| 8,493,331 | B2 * | 7/2013 | Krah .................. G06F 3/04166 345/173 |
| 8,508,244 | B2 | 8/2013 | Seguine |
| 8,514,185 | B2 | 8/2013 | Hotelling |
| 8,552,998 | B2 | 10/2013 | Hotelling et al. |

(56) References Cited

U.S. PATENT DOCUMENTS

| | | | |
|---|---|---|---|
| 8,592,697 B2 | 11/2013 | Hotelling et al. | |
| 8,593,423 B2 | 11/2013 | Hotelling et al. | |
| 8,659,556 B2 | 2/2014 | Wilson | |
| 8,659,568 B2 | 2/2014 | Krah et al. | |
| 8,754,867 B2* | 6/2014 | Krah | G06F 3/0446 345/173 |
| 8,791,920 B2 | 7/2014 | Krah | |
| 8,928,617 B2 | 1/2015 | Hotelling et al. | |
| 8,976,124 B1 | 3/2015 | Wright | |
| 8,988,390 B1 | 3/2015 | Krah et al. | |
| 9,036,650 B2* | 5/2015 | Wilson | G06F 3/0418 370/430 |
| 9,069,408 B2 | 6/2015 | Hotelling et al. | |
| 9,086,750 B2 | 7/2015 | Krah | |
| 9,092,086 B2* | 7/2015 | Krah | G06F 3/0418 |
| 9,348,451 B2 | 5/2016 | Wilson et al. | |
| 9,430,087 B2* | 8/2016 | Krah | G06F 3/0418 |
| 9,483,141 B2 | 11/2016 | Hotelling et al. | |
| 9,552,115 B2 | 1/2017 | Hotelling et al. | |
| 9,606,663 B2 | 3/2017 | Yousefpor et al. | |
| 9,715,306 B2 | 7/2017 | Hotelling et al. | |
| 9,990,084 B2* | 6/2018 | Krah | G06F 3/0416 |
| 10,042,396 B1 | 8/2018 | Gupta et al. | |
| 10,042,472 B2 | 8/2018 | Hotelling et al. | |
| 10,042,476 B2 | 8/2018 | Wilson et al. | |
| 10,139,890 B2 | 11/2018 | Wilson et al. | |
| 10,747,355 B2* | 8/2020 | Krah | G06F 3/0418 |
| 2002/0015024 A1 | 2/2002 | Westerman et al. | |
| 2002/0067348 A1 | 6/2002 | Masters et al. | |
| 2002/0067845 A1 | 6/2002 | Griffis | |
| 2002/0084992 A1 | 7/2002 | Agnew | |
| 2002/0136269 A1 | 9/2002 | Kurabe et al. | |
| 2002/0140689 A1 | 10/2002 | Huang et al. | |
| 2002/0167488 A1 | 11/2002 | Hinckley et al. | |
| 2002/0196066 A1 | 12/2002 | Krah et al. | |
| 2003/0025676 A1 | 2/2003 | Cappendijk | |
| 2003/0048261 A1 | 3/2003 | Yamamoto et al. | |
| 2003/0063073 A1 | 4/2003 | Geaghan et al. | |
| 2003/0067447 A1* | 4/2003 | Geaghan | G06F 3/044 345/173 |
| 2003/0132922 A1 | 7/2003 | Philipp | |
| 2003/0197691 A1 | 10/2003 | Fujiwara et al. | |
| 2004/0056845 A1 | 3/2004 | Harkcom et al. | |
| 2004/0081339 A1 | 4/2004 | Benkley | |
| 2004/0109097 A1 | 6/2004 | Mai | |
| 2004/0141096 A1 | 7/2004 | Mai | |
| 2004/0151235 A1 | 8/2004 | Olson et al. | |
| 2004/0183787 A1 | 9/2004 | Geaghan et al. | |
| 2004/0183833 A1 | 9/2004 | Chua | |
| 2004/0189587 A1 | 9/2004 | Jung et al. | |
| 2004/0227743 A1 | 11/2004 | Brown | |
| 2005/0052427 A1 | 3/2005 | Wu et al. | |
| 2005/0052582 A1 | 3/2005 | Mai | |
| 2005/0094038 A1* | 5/2005 | Choi | G06F 3/0412 349/12 |
| 2005/0104867 A1 | 5/2005 | Westerman et al. | |
| 2005/0146512 A1 | 7/2005 | Hill et al. | |
| 2005/0146513 A1 | 7/2005 | Hill et al. | |
| 2005/0151727 A1 | 7/2005 | Kwong | |
| 2005/0231487 A1 | 10/2005 | Ming | |
| 2005/0243023 A1 | 11/2005 | Reddy et al. | |
| 2006/0007165 A1 | 1/2006 | Yang et al. | |
| 2006/0022955 A1 | 2/2006 | Kennedy | |
| 2006/0022959 A1* | 2/2006 | Geaghan | G06F 3/0416 345/173 |
| 2006/0026521 A1 | 2/2006 | Hotelling et al. | |
| 2006/0097991 A1* | 5/2006 | Hotelling | G06F 3/0412 345/173 |
| 2006/0114247 A1 | 6/2006 | Brown | |
| 2006/0114650 A1 | 6/2006 | Wang et al. | |
| 2006/0132462 A1 | 6/2006 | Geaghan | |
| 2006/0145365 A1 | 7/2006 | Halls et al. | |
| 2006/0146033 A1 | 7/2006 | Chen et al. | |
| 2006/0146034 A1 | 7/2006 | Chen et al. | |
| 2006/0161870 A1 | 7/2006 | Hotelling et al. | |
| 2006/0197750 A1 | 9/2006 | Kerr et al. | |
| 2006/0197753 A1 | 9/2006 | Hotelling | |
| 2006/0213614 A1* | 9/2006 | Unsworth | G06F 3/041 156/324.4 |
| 2006/0244733 A1 | 11/2006 | Geaghan | |
| 2006/0244736 A1 | 11/2006 | Tseng | |
| 2006/0279548 A1 | 12/2006 | Geaghan | |
| 2006/0284856 A1 | 12/2006 | Soss | |
| 2007/0018969 A1 | 1/2007 | Chen et al. | |
| 2007/0062739 A1 | 3/2007 | Philipp et al. | |
| 2007/0075977 A1 | 4/2007 | Chen et al. | |
| 2007/0109274 A1 | 5/2007 | Reynolds | |
| 2007/0176905 A1 | 8/2007 | Shih et al. | |
| 2007/0216657 A1 | 9/2007 | Konicek | |
| 2007/0229468 A1 | 10/2007 | Peng et al. | |
| 2007/0257890 A1* | 11/2007 | Hotelling | G06F 3/0443 345/173 |
| 2007/0262967 A1 | 11/2007 | Rho | |
| 2007/0268272 A1 | 11/2007 | Perski et al. | |
| 2007/0273663 A1 | 11/2007 | Park et al. | |
| 2007/0274411 A1 | 11/2007 | Lee et al. | |
| 2008/0006453 A1 | 1/2008 | Hotelling | |
| 2008/0007539 A1* | 1/2008 | Hotelling | H03K 17/962 345/173 |
| 2008/0012835 A1 | 1/2008 | Rimon et al. | |
| 2008/0018618 A1 | 1/2008 | Hill et al. | |
| 2008/0042964 A1 | 2/2008 | Sako et al. | |
| 2008/0048989 A1 | 2/2008 | Yoon et al. | |
| 2008/0048994 A1 | 2/2008 | Lee et al. | |
| 2008/0055221 A1 | 3/2008 | Yabuta et al. | |
| 2008/0055268 A1 | 3/2008 | Yoo et al. | |
| 2008/0062147 A1 | 3/2008 | Hotelling et al. | |
| 2008/0067528 A1 | 3/2008 | Choi et al. | |
| 2008/0074401 A1 | 3/2008 | Chung et al. | |
| 2008/0079697 A1 | 4/2008 | Lee et al. | |
| 2008/0088594 A1 | 4/2008 | Liu et al. | |
| 2008/0129898 A1 | 6/2008 | Moon | |
| 2008/0136980 A1 | 6/2008 | Rho et al. | |
| 2008/0143683 A1 | 6/2008 | Hotelling | |
| 2008/0150901 A1 | 6/2008 | Lowles et al. | |
| 2008/0156546 A1 | 7/2008 | Hauck | |
| 2008/0157867 A1 | 7/2008 | Krah | |
| 2008/0157882 A1 | 7/2008 | Krah | |
| 2008/0157893 A1* | 7/2008 | Krah | H03L 7/097 331/177 R |
| 2008/0158167 A1* | 7/2008 | Hotelling | G06F 3/0445 345/173 |
| 2008/0158169 A1* | 7/2008 | O'Connor | G06F 3/0418 345/173 |
| 2008/0158172 A1* | 7/2008 | Hotelling | G06F 1/3262 345/173 |
| 2008/0158175 A1 | 7/2008 | Hotelling et al. | |
| 2008/0158180 A1 | 7/2008 | Krah et al. | |
| 2008/0158184 A1 | 7/2008 | Land et al. | |
| 2008/0162996 A1 | 7/2008 | Krah et al. | |
| 2008/0162997 A1 | 7/2008 | Vu et al. | |
| 2008/0165203 A1 | 7/2008 | Pantfoerder | |
| 2008/0278143 A1 | 11/2008 | Cox et al. | |
| 2008/0309625 A1* | 12/2008 | Krah | G06F 3/041 345/173 |
| 2008/0309628 A1 | 12/2008 | Krah et al. | |
| 2009/0009483 A1* | 1/2009 | Hotelling | G06F 3/0416 345/173 |
| 2009/0189867 A1 | 7/2009 | Krah et al. | |
| 2009/0278479 A1 | 11/2009 | Platner et al. | |
| 2009/0283340 A1 | 11/2009 | Liu et al. | |
| 2009/0314621 A1 | 12/2009 | Hotelling | |
| 2009/0315840 A1 | 12/2009 | Park et al. | |
| 2010/0059295 A1 | 3/2010 | Hotelling et al. | |
| 2010/0060589 A1 | 3/2010 | Wilson | |
| 2010/0060590 A1 | 3/2010 | Wilson et al. | |
| 2010/0060591 A1 | 3/2010 | Yousefpor et al. | |
| 2010/0060593 A1 | 3/2010 | Krah | |
| 2010/0060608 A1 | 3/2010 | Yousefpor | |
| 2010/0214232 A1 | 8/2010 | Chan et al. | |
| 2010/0328265 A1 | 12/2010 | Hotelling et al. | |

(56) References Cited

U.S. PATENT DOCUMENTS

| | | | |
|---|---|---|---|
| 2011/0025634 A1* | 2/2011 | Krah | G06F 3/0445 345/173 |
| 2011/0042152 A1 | 2/2011 | Wu | |
| 2011/0063993 A1* | 3/2011 | Wilson | G06F 1/3262 370/254 |
| 2011/0084857 A1 | 4/2011 | Marino et al. | |
| 2012/0019467 A1 | 1/2012 | Hotelling et al. | |
| 2012/0044194 A1 | 2/2012 | Peng et al. | |
| 2012/0280932 A1 | 11/2012 | Krah et al. | |
| 2012/0299880 A1 | 11/2012 | Krah | |
| 2013/0271410 A1* | 10/2013 | Krah | G06F 3/04166 345/173 |
| 2014/0022203 A1 | 1/2014 | Karpin et al. | |
| 2014/0043293 A1 | 2/2014 | Hotelling et al. | |
| 2014/0092063 A1 | 4/2014 | Krah et al. | |
| 2014/0168143 A1 | 6/2014 | Hotelling et al. | |
| 2014/0240287 A1* | 8/2014 | Krah | G06F 3/04166 345/174 |
| 2014/0306913 A1 | 10/2014 | Krah | |
| 2014/0375612 A1 | 12/2014 | Hotelling et al. | |
| 2015/0234535 A1 | 8/2015 | Hotelling et al. | |
| 2015/0261285 A1 | 9/2015 | Wilson et al. | |
| 2015/0301681 A1* | 10/2015 | Krah | G06F 3/0445 345/174 |
| 2016/0266718 A1 | 9/2016 | Wilson et al. | |
| 2016/0364078 A1* | 12/2016 | Krah | G06F 3/04166 |
| 2017/0010744 A1 | 1/2017 | Hotelling et al. | |
| 2017/0097728 A1 | 4/2017 | Hotelling et al. | |
| 2017/0322669 A1 | 11/2017 | Hotelling et al. | |
| 2018/0275820 A1* | 9/2018 | Krah | G06F 3/041 |
| 2018/0348957 A1 | 12/2018 | Wilson et al. | |

FOREIGN PATENT DOCUMENTS

| | | |
|---|---|---|
| CN | 1773442 A | 5/2006 |
| CN | 1914585 A | 2/2007 |
| EP | 0818751 A1 | 1/1998 |
| EP | 1387242 A2 | 2/2004 |
| EP | 1387242 A3 | 3/2006 |
| EP | 2453341 A1 | 5/2012 |
| GB | 1440130 A | 6/1976 |
| GB | 2451973 A | 2/2009 |
| GB | 2451973 B | 4/2011 |
| JP | 2000-163031 A | 6/2000 |
| JP | 2002-342033 A | 11/2002 |
| KR | 98-10726 A | 4/1998 |
| WO | 1996/018179 A1 | 6/1996 |
| WO | 1998/002964 A1 | 1/1998 |
| WO | 1998/007127 A1 | 2/1998 |
| WO | 2004/099964 A2 | 11/2004 |
| WO | 2004/099964 A3 | 4/2006 |
| WO | 2008/010917 A1 | 1/2008 |
| WO | 2008/085416 A1 | 7/2008 |
| WO | 2008/085457 A2 | 7/2008 |
| WO | 2008/085719 A2 | 7/2008 |
| WO | 2008/085457 A3 | 9/2008 |
| WO | 2008/157245 A2 | 12/2008 |
| WO | 2008/157252 A1 | 12/2008 |
| WO | 2010/030706 A1 | 3/2010 |
| WO | 2010/030709 A1 | 3/2010 |

OTHER PUBLICATIONS

Advisory Action received for U.S. Appl. No. 12/874,184, dated Feb. 10, 2012, 3 pages.
Advisory Action received for U.S. Appl. No. 14/482,979, dated Aug. 1, 2016, 3 pages.
Advisory Action received for U.S. Appl. No. 14/715,351, dated Jul. 5, 2018, 5 pages.
Advisory Action received for U.S. Appl. No. 15/158,461, dated Oct. 31, 2017, 2 pages.
Applicant Initiated Interview Summary received for U.S. Appl. No. 14/482,979, dated Jul. 21, 2016, 3 pages.
Corrected Notice of Allowance received for U.S. Appl. No. 14/056,841, dated Mar. 6, 2015, 7 pages.
Corrected Notice of Allowance received for U.S. Appl. No. 14/056,841, dated Mar. 19, 2015, 7 pages.
Decision to Grant received for European Patent Application No. 17203367.2, dated May 9, 2019, 2 pages.
Examination Report received for GB Patent Application No. 0808783.5, dated Oct. 15, 2008, 3 pages.
Examiner's Answer to Appeal Brief received for U.S. Appl. No. 15/380,747, dated Apr. 1, 2019, 9 pages.
Fakatselis, J., Processing Gain for Direct Sequence Spread Spectrum Communication Systems and PRISM, Application Note AN9633, Intersil, Aug. 1996, 4 pages.
Final Office Action received for U.S. Appl. No. 11/650,046, dated May 3, 2011, 10 pages.
Final Office Action received for U.S. Appl. No. 11/818,345, dated Feb. 1, 2011, 21 pages.
Final Office Action received for U.S. Appl. No. 12/208,315, dated Dec. 5, 2013, 23 pages.
Final Office Action received for U.S. Appl. No. 12/208,315, dated Dec. 24, 2015, 28 pages.
Final Office Action received for U.S. Appl. No. 12/208,315, dated Oct. 7, 2014, 28 pages.
Final Office Action received for U.S. Appl. No. 12/208,315, dated Oct. 12, 2012, 21 pages.
Final Office Action received for U.S. Appl. No. 12/208,329, dated Dec. 30, 2013, 12 pages.
Final Office Action received for U.S. Appl. No. 12/208,329, dated Feb. 26, 2015, 13 pages.
Final Office Action received for U.S. Appl. No. 12/283,423, dated Aug. 28, 2012, 10 pages.
Final Office Action received for U.S. Appl. No. 12/557,814, dated Nov. 6, 2013, 21 pages.
Final Office Action received for U.S. Appl. No. 12/874,184, dated Sep. 1, 2011, 19 pages.
Final Office Action received for U.S. Appl. No. 13/250,984, dated Aug. 17, 2012, 15 pages.
Final Office Action received for U.S. Appl. No. 14/482,979, dated Feb. 4, 2016, 12 pages.
Final Office Action received for U.S. Appl. No. 14/715,351, dated Feb. 13, 2018, 29 pages.
Final Office Action received for U.S. Appl. No. 15/158,461, dated Jun. 1, 2017, 17 pages.
Final Office Action received for U.S. Appl. No. 15/380,747, dated Jul. 2, 2018, 9 pages.
Final Office Action received for U.S. Appl. No. 16/056,180, dated Jul. 11, 2019, 13 pages.
First Action Interview Office Action received for U.S. Appl. No. 14/715,351, dated Aug. 10, 2017, 7 pages.
International Search Report received for PCT Patent Application No. PCT/US2007/026177, dated Jun. 11, 2008, 3 pages.
International Search Report received for PCT Patent Application No. PCT/US2007/088750, dated Apr. 6, 2009, 6 pages.
International Search Report received for PCT Patent Application No. PCT/US2008/066743, dated Oct. 30, 2009, 6 pages.
International Search Report received for PCT Patent Application No. PCT/US2008/066759, dated Oct. 6, 2008, 2 pages.
International Search Report received for PCT Patent Application No. PCT/US2009/056410, dated Dec. 22, 2009, 3 pages.
International Search Report received for PCT Patent Application No. PCT/US2009/056413, dated Dec. 21, 2009, 3 pages.
Kanda et al., 55.2: Integrated Active Matrix Capacitive Sensors for Touch Panel LTPS-TFT LCDs, SID 08 Digest, 2008, 834-837.
Lee et al., A Multi-Touch Three Dimensional Touch-Sensitive Tablet, CHI'85 Proceedings, Apr. 1985, pp. 21-25.
Non-Final Office Action received for U.S. Appl. No. 11/619,433, dated Nov. 4, 2009, 34 pages.
Non-Final Office Action received for U.S. Appl. No. 11/650,046, dated Jun. 8, 2010, 12 pages.
Non-Final Office Action received for U.S. Appl. No. 11/650,046, dated Nov. 22, 2010, 11 pages.
Non-Final Office Action received for U.S. Appl. No. 11/818,345, dated May 12, 2010, 28 pages.

(56) References Cited

OTHER PUBLICATIONS

Non-Final Office Action received for U.S. Appl. No. 11/818,454, dated May 10, 2010, 17 pages.
Non-Final Office Action received for U.S. Appl. No. 12/208,315, dated Apr. 30, 2013, 23 pages.
Non-Final Office Action received for U.S. Appl. No. 12/208,315, dated Dec. 19, 2011, 22 pages.
Non-Final Office Action received for U.S. Appl. No. 12/208,315, dated Mar. 14, 2014, 26 pages.
Non-Final Office Action received for U.S. Appl. No. 12/208,315, dated May 14, 2015, 26 pages.
Non-Final Office Action received for U.S. Appl. No. 12/208,329, dated Aug. 29, 2013, 14 pages.
Non-Final Office Action received for U.S. Appl. No. 12/208,329, dated Dec. 14, 2015, 14 pages.
Non-Final Office Action received for U.S. Appl. No. 12/208,329, dated Jun. 6, 2014, 13 pages.
Non-Final Office Action received for U.S. Appl. No. 12/208,329, dated Nov. 25, 2011, 32 pages.
Non-Final Office Action received for U.S. Appl. No. 12/208,329, dated Sep. 28, 2012, 34 pages.
Non-Final Office Action received for U.S. Appl. No. 12/208,334, dated Sep. 8, 2011, 17 pages.
Non-Final Office Action received for U.S. Appl. No. 12/283,423, dated Jan. 18, 2013, 10 pages.
Non-Final Office Action received for U.S. Appl. No. 12/283,423, dated Nov. 17, 2011, 10 pages.
Non-Final Office Action received for U.S. Appl. No. 12/283,435, dated May 20, 2011, 7 pages.
Non-Final Office Action received for U.S. Appl. No. 12/557,814, dated Apr. 2, 2013, 25 pages.
Non-Final Office Action received for U.S. Appl. No. 12/874,184, dated Apr. 27, 2011, 19 pages.
Non-Final Office Action received for U.S. Appl. No. 12/874,184, dated May 2, 2012, 21 pages.
Non-Final Office Action received for U.S. Appl. No. 12/874,184, dated Oct. 25, 2012, 23 pages.
Non-Final Office Action received for U.S. Appl. No. 12/904,012, dated Mar. 7, 2011, 26 pages.
Non-Final Office Action received for U.S. Appl. No. 13/250,984, dated Apr. 13, 2012, 15 pages.
Non-Final Office Action received for U.S. Appl. No. 13/250,984, dated Dec. 7, 2012, 10 pages.
Non-Final Office Action received for U.S. Appl. No. 13/250,984, dated Nov. 7, 2011, 10 pages.
Non-Final Office Action received for U.S. Appl. No. 13/553,421, dated Apr. 25, 2013, 11 pages.
Non-Final Office Action received for U.S. Appl. No. 13/568,027, dated Apr. 23, 2013, 9 pages.
Non-Final Office Action received for U.S. Appl. No. 13/568,027, dated Oct. 5, 2012, 7 pages.
Non-Final Office Action received for U.S. Appl. No. 13/916,357, dated Aug. 23, 2013, 18 pages.
Non-Final Office Action received for U.S. Appl. No. 14/056,841, dated May 13, 2014, 7 pages.
Non-Final Office Action received for U.S. Appl. No. 14/315,162, dated Sep. 29, 2014, 8 pages.
Non-Final Office Action received for U.S. Appl. No. 14/482,979, dated Jul. 29, 2015, 20 pages.
Non-Final Office Action received for U.S. Appl. No. 15/158,461, dated Aug. 8, 2016, 16 pages.
Non-Final Office Action received for U.S. Appl. No. 15/270,950, dated Oct. 28, 2016, 7 pages.
Non-Final Office Action received for U.S. Appl. No. 15/380,747, dated Jan. 31, 2018, 7 pages.
Non-Final Office Action received for U.S. Appl. No. 15/997,541, dated Nov. 6, 2019, 8 pages.
Non-Final Office Action received for U.S. Appl. No. 16/056,180, dated Oct. 18, 2018, 15 pages.
Notice of Allowance received for U.S. Appl. No. 11/619,433, dated Jun. 7, 2010, 11 pages.
Notice of Allowance received for U.S. Appl. No. 11/650,046, dated Mar. 28, 2012, 7 pages.
Notice of Allowance received for U.S. Appl. No. 11/818,345, dated Apr. 8, 2013, 21 pages.
Notice of Allowance received for U.S. Appl. No. 11/818,454, dated Sep. 29, 2010, 7 pages.
Notice of Allowance received for U.S. Appl. No. 12/208,315, dated Mar. 14, 2016, 13 pages.
Notice of Allowance received for U.S. Appl. No. 12/208,329, dated Dec. 14, 2016, 7 pages.
Notice of Allowance received for U.S. Appl. No. 12/208,329, dated Mar. 21, 2013, 15 pages.
Notice of Allowance received for U.S. Appl. No. 12/208,329, dated Sep. 14, 2016, 8 pages.
Notice of Allowance received for U.S. Appl. No. 12/283,423, dated Aug. 29, 2013, 8 pages.
Notice of Allowance received for U.S. Appl. No. 12/283,435, dated Apr. 5, 2012, 8 pages.
Notice of Allowance received for U.S. Appl. No. 12/557,814, dated Jan. 21, 2015, 5 pages.
Notice of Allowance received for U.S. Appl. No. 12/874,184, dated Jun. 4, 2013, 15 pages.
Notice of Allowance received for U.S. Appl. No. 12/904,012, dated Nov. 16, 2011, 9 pages.
Notice of Allowance received for U.S. Appl. No. 12/904,012, dated Sep. 22, 2011, 10 pages.
Notice of Allowance received for U.S. Appl. No. 13/250,984, dated Aug. 23, 2013, 10 pages.
Notice of Allowance received for U.S. Appl. No. 13/250,984, dated May 23, 2013, 10 pages.
Notice of Allowance received for U.S. Appl. No. 13/568,027, dated Mar. 11, 2014, 8 pages.
Notice of Allowance received for U.S. Appl. No. 13/568,027, dated Nov. 25, 2013, 9 pages.
Notice of Allowance received for U.S. Appl. No. 13/916,357, dated Feb. 6, 2014, 8 pages.
Notice of Allowance received for U.S. Appl. No. 13/935,333, dated Dec. 3, 2014, 10 pages.
Notice of Allowance received for U.S. Appl. No. 14/019,264, dated Jun. 13, 2014, 15 pages.
Notice of Allowance received for U.S. Appl. No. 14/056,841, dated Jan. 15, 2015, 11 pages.
Notice of Allowance received for U.S. Appl. No. 14/315,162, dated May 18, 2015, 9 pages.
Notice of Allowance received for U.S. Appl. No. 14/482,979, dated Aug. 29, 2016, 19 pages.
Notice of Allowance received for U.S. Appl. No. 14/704,885, dated Jul. 15, 2016, 8 pages.
Notice of Allowance received for U.S. Appl. No. 14/715,351, dated Jul. 27, 2018, 5 pages.
Notice of Allowance received for U.S. Appl. No. 14/791,145, dated May 11, 2016, 18 pages.
Notice of Allowance received for U.S. Appl. No. 15/158,461, dated May 22, 2018, 9 pages.
Notice of Allowance received for U.S. Appl. No. 15/250,736, dated Apr. 10, 2018, 9 pages.
Notice of Allowance received for U.S. Appl. No. 15/270,950, dated Apr. 6, 2017, 7 pages.
Notice of Allowance received for U.S. Appl. No. 15/658,314, dated May 31, 2018, 8 pages.
Notice of Allowance received for U.S. Appl. No. 15/997,541, dated Apr. 15, 2020, 8 pages.
Notice of Allowance received for U.S. Appl. No. 13/553,421, dated Sep. 27, 2013, 8 pages.
Notice of Allowance received for U.S. Appl. No. 14/270,147, dated Mar. 25, 2015, 11 Pages.
Pre-Interview First Office Action received for U.S. Appl. No. 14/715,351, dated Mar. 29, 2017, 6 pages.
Restriction Requirement received for U.S. Appl. No. 11/619,433, dated Apr. 12, 2010, 5 pages.

(56) References Cited

OTHER PUBLICATIONS

Restriction Requirement received for U.S. Appl. No. 12/208,329, dated Jul. 15, 2011, 5 pages.
Restriction Requirement received for U.S. Appl. No. 12/283,435, dated Dec. 21, 2011, 6 pages.
Restriction Requirement received for U.S. Appl. No. 14/056,841, dated Jan. 16, 2014, 5 pages.
Rubine, Dean H., the Automatic Recognition of Gestures, CMU-CS-91-202, Submitted in Partial Fulfillment of the Requirements for the Degree of Doctor of Philosophy in Computer Science at Carnegie Mellon University, Dec. 1991, 285 pages.
Rubine, Dean, Combining Gestures and Direct Manipulation, CHI'92, May 3-7, 1992, pp. 659-660.
Search Report received for Chinese Patent Application No. ZL2008201335089, dated Nov. 24, 2011, 9 pages.
Search Report received for European Patent Application No. 11188985.3, dated Apr. 17, 2012, 6 pages.
Search Report received for European Patent Application No. 16178444.2, dated Oct. 4, 2016, 4 pages.
Search Report received for GB Patent Application No. 0808783.5, dated Jun. 25, 2012, 1 page.
Search Report received for GB Patent Application No. 0808783.5, dated Oct. 15, 2008, 2 pages.
Search Report received for Netherlands Patent Application No. 2001666, dated Apr. 24, 2009, 12 pages.
Search Report received for Taiwanese Patent Application No. 097100216, dated Aug. 16, 2012, 2 pages.
Search Report received for Taiwanese Patent Application No. 102100040, dated May 25, 2015, 2 pages.
Westerman, Wayne, Hand Tracking, Finger Identification, and Chordic Manipulation on a Multi-Touch Surface, A Dissertation Submitted to the Faculty of the University of Delaware in Partial Fulfillment of the Requirements for the Degree of Doctor of Philosophy in Electrical Engineering, 1999, 363 pages.
Wikipedia, Phase (Waves), Available Online at: <http://en.wikipedia.org/w/index.php?title=phase_(wave)$oldid=136332745>, Jun. 6, 2007, 2 pages.
Wikipedia, Signal Generator, Available Online at: <http://en.wikipedia.org/w/index.php?title=signal_generator$oldid= 137433567>, Jun. 11, 2007, 2 pages.
Notice of Allowance received for U.S. Appl. No. 15/380,747, dated Jul. 14, 2020, 8 pages.
Patent Board Decision received for U.S. Appl. No. 15/380,747, mailed on Jul. 2, 2020, 8 pages.
Notice of Allowance received for U.S. Appl. No. 15/380,747, dated Sep. 22, 2020, 8 pages.

* cited by examiner

| step | R0 | R1 | R2 | R3 | R4 | R5 | R6 | R7 | R8 | R9 | R10 | R11 | R12 | R13 | R14 | what | result | start (ms) | done (ms) |
|---|---|---|---|---|---|---|---|---|---|---|---|---|---|---|---|---|---|---|---|
| 0 | no | no | no | no | no | no | no | no | no | no | no | no | no | no | no | LCD | n/a | 0 | 12.0 |
| 1 | no | no | no | no | no | no | no | no | no | no | no | no | no | no | no | spectrum | 200-300 kHz | 12.0 | 12.2 |
| 2 | no | no | no | no | no | no | no | no | no | no | no | no | no | no | no | analyzer | 300-400 kHz | 12.2 | 12.4 |
| 3 | no | no | no | no | no | no | no | no | no | no | no | no | no | no | no | ID low noise fs | {A,B,C} | 12.4 | 12.6 |
| 4 | +A | +B | +C | no | +A | +B | -C | no | +A | -B | -C | no | +A | -B | +C | scan | xa1*,xb1*,xc1* | 12.6 | 12.8 |
| 5 | +A | +B | +C | no | +A | -B | -C | no | -A | -B | +C | no | -A | +B | -C | scan | xa2*,xb2*,xc2* | 12.8 | 13.0 |
| 6 | +A | +B | +C | no | -A | -B | +C | no | -A | +B | +C | no | +A | -B | +C | scan | xa3*,xb3*,xc3* | 13.0 | 13.2 |
| 7 | +A | +B | +C | no | -A | +B | +C | no | +A | +B | -C | no | -A | +B | -C | scan | xa4*,xb4*,xc4* | 13.2 | 13.4 |
| 8 | no | +A | +B | +C | no | +A | +B | -C | no | +A | -B | -C | no | +A | -B | scan | xa5*,xb5*,xc5* | 13.4 | 13.6 |
| 9 | no | +A | +B | +C | no | +A | -B | -C | no | -A | -B | +C | no | -A | +B | scan | xa6*,xb6*,xc6* | 13.6 | 13.8 |
| 10 | no | +A | +B | +C | no | -A | -B | +C | no | -A | +B | +C | no | +A | -B | scan | xa7*,xb7*,xc7* | 13.8 | 14.0 |
| 11 | no | +A | +B | +C | no | -A | +B | +C | no | +A | +B | -C | no | -A | +B | scan | xa8*,xb8*,xc8* | 14.0 | 14.2 |
| 12 | +C | no | +A | +B | +C | no | +A | +B | -C | no | +A | -B | -C | no | +A | scan | xa9*,xb9*,xc9* | 14.2 | 14.4 |
| 13 | -C | no | +A | +B | +C | no | +A | -B | -C | no | -A | -B | +C | no | -A | scan | xa10*,xb10*,xc10* | 14.4 | 14.6 |
| 14 | +C | no | +A | +B | +C | no | -A | -B | +C | no | -A | +B | +C | no | +A | scan | xa11*,xb11*,xc11* | 14.6 | 14.8 |
| 15 | -C | no | +A | +B | +C | no | -A | +B | +C | no | +A | +B | -C | no | -A | scan | xa12*,xb12*,xc12* | 14.8 | 15.0 |
| 16 | -B | +C | no | +A | +B | +C | no | +A | +B | -C | no | +A | -B | -C | no | scan | xa13*,xb13*,xc13* | 15.0 | 15.2 |
| 17 | +B | -C | no | +A | +B | +C | no | +A | -B | -C | no | -A | -B | +C | no | scan | xa14*,xb14*,xc14* | 15.2 | 15.4 |
| 18 | -B | +C | no | +A | +B | +C | no | -A | -B | +C | no | -A | +B | +C | no | scan | xa15*,xb15*,xc15* | 15.4 | 15.6 |
| 19 | +B | -C | no | +A | +B | +C | no | -A | +B | +C | no | +A | +B | -C | no | scan | xa16*,xb16*,xc16* | 15.6 | 15.8 |

\* vector of M values, one value for each channel

Fig. 4c

| Row | Freq. A result | Freq. B result | Freq. C result |
|---|---|---|---|
| R0 | (xa1[chM]+xa2[chM]+xa3[chM]+xa4[chM])/4 | (-xb13[chM]+xb14[chM]-xb15[chM]+xb16[chM])/4 | (xc9[chM]-xc10[chM]+xc11[chM]-xc12[chM])/4 |
| R1 | (xa5[chM]+xa6[chM]+xa7[chM]+xa8[chM])/4 | (xb1[chM]+xb2[chM]+xb3[chM]+xb4[chM])/4 | (xc13[chM]-xc14[chM]+xc15[chM]-xc16[chM])/4 |
| R2 | (xa9[chM]+xa10[chM]+xa11[chM]+xa12[chM])/4 | (xb5[chM]+xb6[chM]+xb7[chM]+xb8[chM])/4 | (xc1[chM]+xc2[chM]+xc3[chM]+xc4[chM])/4 |
| R3 | (xa13[chM]+xa14[chM]+xa15[chM]+xa16[chM])/4 | (xb9[chM]+xb10[chM]+xb11[chM]+xb12[chM])/4 | (xc5[chM]+xc6[chM]+xc7[chM]+xc8[chM])/4 |
| R4 | (xa1[chM]+xa2[chM]-xa3[chM]-xa4[chM])/4 | (xb13[chM]+xb14[chM]+xb15[chM]+xb16[chM])/4 | (xc9[chM]+xc10[chM]+xc11[chM]+xc12[chM])/4 |
| R5 | (xa5[chM]+xa6[chM]-xa7[chM]-xa8[chM])/4 | (xb1[chM]-xb2[chM]-xb3[chM]+xb4[chM])/4 | (xc13[chM]+xc14[chM]+xc15[chM]+xc16[chM])/4 |
| R6 | (xa9[chM]+xa10[chM]-xa11[chM]-xa12[chM])/4 | (xb5[chM]-xb6[chM]-xb7[chM]+xb8[chM])/4 | (-xc1[chM]-xc2[chM]+xc3[chM]+xc4[chM])/4 |
| R7 | (xa13[chM]+xa14[chM]-xa15[chM]-xa16[chM])/4 | (xb9[chM]-xb10[chM]-xb11[chM]+xb12[chM])/4 | (-xc5[chM]-xc6[chM]+xc7[chM]+xc8[chM])/4 |
| R8 | (xa1[chM]-xa2[chM]-xa3[chM]+xa4[chM])/4 | (xb13[chM]-xb14[chM]-xb15[chM]+xb16[chM])/4 | (-xc9[chM]-xc10[chM]+xc11[chM]+xc12[chM])/4 |
| R9 | (xa5[chM]-xa6[chM]-xa7[chM]+xa8[chM])/4 | (-xb1[chM]-xb2[chM]+xb3[chM]+xb4[chM])/4 | (-xc13[chM]-xc14[chM]+xc15[chM]+xc16[chM])/4 |
| R10 | (xa9[chM]-xa10[chM]-xa11[chM]+xa12[chM])/4 | (-xb5[chM]-xb6[chM]+xb7[chM]+xb8[chM])/4 | (-xc1[chM]+xc2[chM]+xc3[chM]-xc4[chM])/4 |
| R11 | (xa13[chM]-xa14[chM]-xa15[chM]+xa16[chM])/4 | (-xb9[chM]-xb10[chM]+xb11[chM]+xb12[chM])/4 | (-xc5[chM]+xc6[chM]+xc7[chM]-xc8[chM])/4 |
| R12 | (xa1[chM]-xa2[chM]+xa3[chM]-xa4[chM])/4 | (-xb13[chM]-xb14[chM]+xb15[chM]+xb16[chM])/4 | (-xc9[chM]+xc10[chM]+xc11[chM]-xc12[chM])/4 |
| R13 | (xa5[chM]-xa6[chM]+xa7[chM]-xa8[chM])/4 | (-xb1[chM]+xb2[chM]-xb3[chM]+xb4[chM])/4 | (-xc13[chM]+xc14[chM]+xc15[chM]-xc16[chM])/4 |
| R14 | (xa9[chM]-xa10[chM]+xa11[chM]-xa12[chM])/4 | (-xb5[chM]+xb6[chM]-xb7[chM]+xb8[chM])/4 | (xc1[chM]-xc2[chM]+xc3[chM]-xc4[chM])/4 |

Fig. 4d

TOUCH DETECTION USING MULTIPLE SIMULTANEOUS STIMULATION SIGNALS

CROSS-REFERENCE TO RELATED APPLICATIONS

This application is a continuation of U.S. patent application Ser. No. 15/997,541, filed Jun. 4, 2018 (published on Sep. 27, 2018 as U.S. Publication No. 2018-0275820), which is a continuation application of U.S. patent application Ser. No. 15/250,736, filed Aug. 29, 2016 (now U.S. Pat. No. 9,990,084, issued Jun. 5, 2018), which is a continuation of U.S. patent application Ser. No. 14/791,145, filed Jul. 2, 2015 (now U.S. Pat. No. 9,430,087, issued Aug. 30, 2016), which is a continuation application of U.S. patent application Ser. No. 14/270,147, filed May 5, 2014 (now U.S. Pat. No. 9,092,086, issued Jul. 28, 2015), which is a continuation of U.S. patent application Ser. No. 13/916,357, filed Jun. 12, 2013 (now U.S. Pat. No. 8,754,867, issued Jun. 17, 2014), which is a continuation of U.S. patent application Ser. No. 11/818,345, filed Jun. 13, 2007 (now U.S. Pat. No. 8,493,331, issued Jul. 23, 2013) all of which are hereby incorporated by reference in their entirety for all purposes.

FIELD OF THE INVENTION

This relates to touch sensor panels used as input devices for computing systems, and more particularly, to the use of multiple digital mixers to perform spectrum analysis of noise and identify low noise stimulation frequencies, and to the use of multiple stimulation frequencies and phases to detect and localize touch events on a touch sensor panel.

BACKGROUND OF THE INVENTION

Many types of input devices are presently available for performing operations in a computing system, such as buttons or keys, mice, trackballs, touch sensor panels, joysticks, touch screens and the like. Touch screens, in particular, are becoming increasingly popular because of their ease and versatility of operation as well as their declining price. Touch screens can include a touch sensor panel, which can be a clear panel with a touch-sensitive surface, and a display device that can be positioned behind the panel so that the touch-sensitive surface can substantially cover the viewable area of the display device. Touch screens can allow a user to perform various functions by touching the touch sensor panel using a finger, stylus or other object at a location dictated by a user interface (UI) being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Touch sensor panels can be formed from a matrix of row and column traces, with sensors or pixels present where the rows and columns cross over each other while being separated by a dielectric material. Each row can be driven by a stimulation signal, and touch locations can be identified because the charge injected into the columns due to the stimulation signal is proportional to the amount of touch. However, the high voltage that can be required for the stimulation signal can force the sensor panel circuitry to be larger in size, and separated into two or more discrete chips. In addition, touch screens formed from capacitance-based touch sensor panels and display devices such as liquid crystal displays (LCDs) can suffer from noise problems because the voltage switching required to operate an LCD can capacitively couple onto the columns of the touch sensor panel and cause inaccurate measurements of touch. Furthermore, alternating current (AC) adapters used to power or charge the system can also couple noise into the touchscreen. Other sources of noise can include switching power supplies in the system, backlight inverters, and light emitting diode (LED) pulse drivers. Each of these noise sources has a unique frequency and amplitude of interference that can change with respect to time.

SUMMARY OF THE INVENTION

This relates to the use of multiple digital mixers to perform spectrum analysis of noise and identify low noise stimulation frequencies, and to the use of multiple stimulation frequencies and phases to detect and localize touch events on a touch sensor panel. Each of a plurality of sense channels can be coupled to a column in a touch sensor panel and can have multiple mixers. Each mixer in each sense channel can utilize a circuit capable of being controlled to generate a demodulation frequency of a particular frequency, phase and delay.

When performing a spectrum analyzer function, no stimulation signal is applied to any of the rows in the touch sensor panel. The sum of the output of all sense channels, which can represent the total charge being applied to the touch sensor panel including all detected noise, can be fed back to each of the mixers in each sense channel. The mixers can be paired up, and each pair of mixers can demodulate the sum of all sense channels using the in-phase (I) and quadrature (Q) signals of a particular frequency. The demodulated outputs of each mixer pair can be used to calculate the magnitude of the noise at that particular frequency, wherein the lower the magnitude, the lower the noise at that frequency. Several low noise frequencies can be selected for use in a subsequent touch sensor panel scan function.

When performing the touch sensor panel scan function, at each of multiple steps, various phases of the selected low noise frequencies can be used to simultaneously stimulate the rows of the touch sensor panel, and the multiple mixers in each sense channel can be configured to demodulate the signal received from the column connected to each sense channel using the selected low noise frequencies. The demodulated signals from the multiple mixers can then be saved. After all steps have been completed, the saved results can be used in calculations to determine an image of touch for the touch sensor panel at each frequency.

BRIEF DESCRIPTION OF THE DRAWINGS

FIG. 4c illustrates an exemplary capacitive scanning plan according to one embodiment of this invention.

FIG. 4d illustrates exemplary calculations for a particular channel M to compute full image results at different low noise frequencies according to one embodiment of this invention.

DETAILED DESCRIPTION OF THE PREFERRED EMBODIMENT

Figure 1:
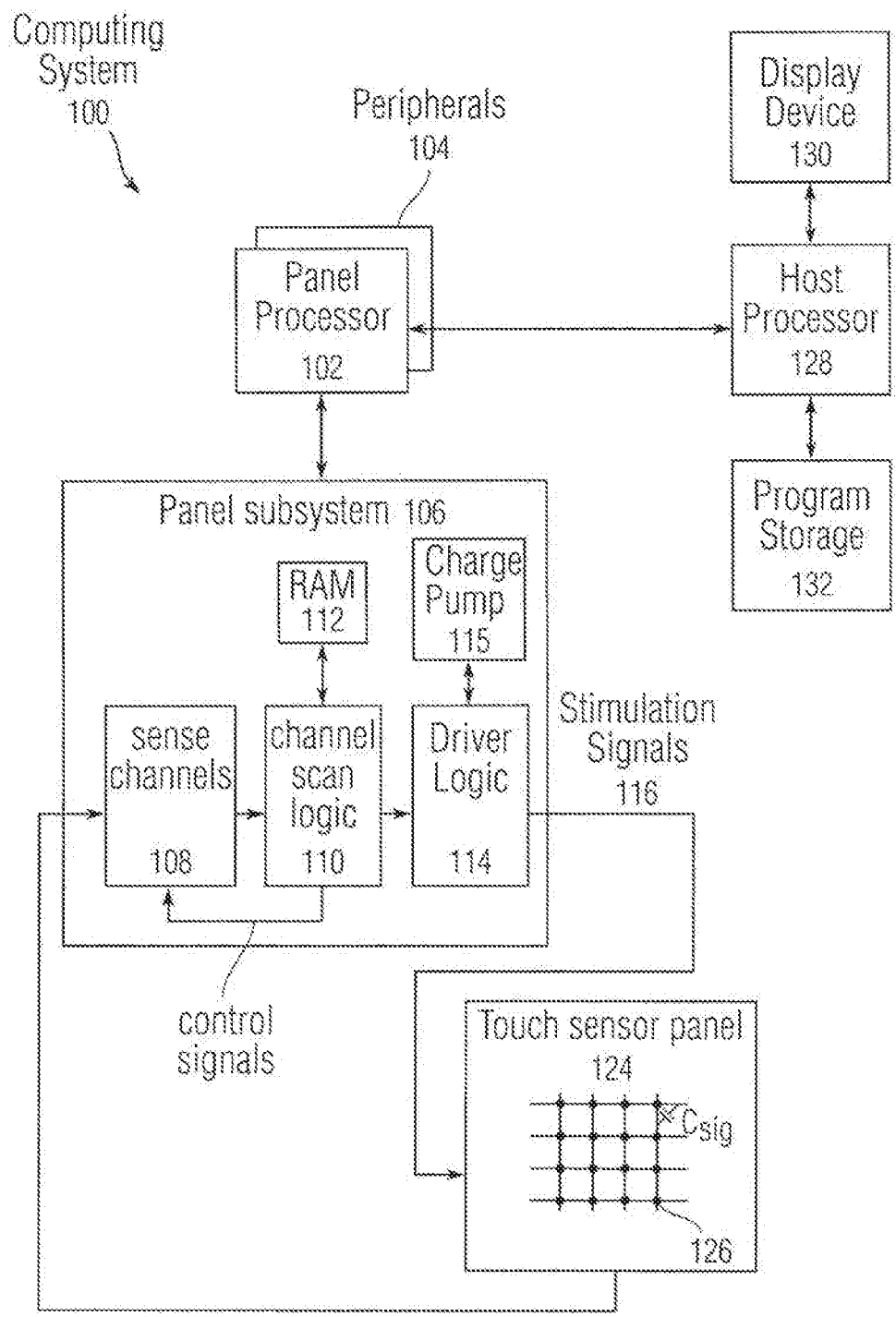
FIG. 1 illustrates an exemplary computing system that can utilize multiple digital mixers to perform spectrum analysis of noise and identify low noise stimulation frequencies, and can utilize multiple stimulation frequencies and phases to detect and localize touch events on a touch sensor panel according to one embodiment of this invention.

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

This relates to the use of multiple digital mixers to perform spectrum analysis of noise to identify low noise stimulation frequencies, and the use of multiple stimulation frequencies and phases to detect and localize touch events on a touch sensor panel. Each of a plurality of sense channels can be coupled to a column in a touch sensor panel and can have multiple mixers. Each mixer in the sense channel can utilize a circuit capable of being controlled to generate a demodulation frequency of a particular frequency, phase and delay.

When performing a spectrum analyzer function, no stimulation signal is applied to any of the rows in the touch sensor panel. The sum of the output of all sense channels, which can represent the total charge being applied to the touch sensor panel including all detected noise, can be fed back to each of the mixers in each sense channel. The mixers can be paired up, and each pair of mixers can demodulate the sum of all sense channels using the in-phase (I) and quadrature (Q) signals of a particular frequency. The demodulated outputs of each mixer pair can be used to calculate the magnitude of the noise at that particular frequency, wherein the lower the magnitude, the lower the noise at that frequency. Several low noise frequencies can be selected for use in a subsequent touch sensor panel scan function.

When performing the touch sensor panel scan function, at each of multiple steps, various phases of the selected low noise frequencies can be used to simultaneously stimulate the rows of the touch sensor panel, and the multiple mixers in each sense channel can be configured to demodulate the signal received from the column connected to each sense channel using the selected low noise frequencies. The demodulated signals from the multiple mixers can then be saved. After all steps have been completed, the saved results can be used in calculations to determine an image of touch for the touch sensor panel at each frequency.

Although some embodiments of this invention may be described herein in terms of mutual capacitance touch sensors, it should be understood that embodiments of this invention are not so limited, but are generally applicable to other types of touch sensors such as self capacitance touch sensors. Furthermore, although the touch sensors in the touch sensor panel may be described herein in terms of an orthogonal array of touch sensors having rows and columns, it should be understood that embodiments of this invention are not limited to orthogonal arrays, but can be generally applicable to touch sensors arranged in any number of dimensions and orientations, including diagonal, concentric circle, and three-dimensional and random orientations. In addition, the touch sensor panel described herein can be either a single-touch or a multi-touch sensor panel, the latter of which is described in Applicant's co-pending U.S. application Ser. No. 10/842,862 entitled "Multipoint Touchscreen," filed on May 6, 2004 and published as U.S. Published Application No. 2006/0097991 on May 11, 2006, the contents of which are incorporated by reference herein.

FIG. 1 illustrates exemplary computing system 100 that can utilize multiple digital mixers to perform spectrum analysis of noise and identify low noise stimulation frequencies, and can utilize multiple stimulation frequencies and phases to detect and localize touch events on a touch sensor panel according to embodiments of the invention. Computing system 100 can include one or more panel processors 102 and peripherals 104, and panel subsystem 106. One or more panel processors 102 can include, for example, ARM968 processors or other processors with similar functionality and capabilities. However, in other embodiments, the panel processor functionality can be implemented instead by dedicated logic, such as a state machine. Peripherals 104 can include, but are not limited to, random access memory (RAM) or other types of memory or storage, watchdog timers and the like. Panel subsystem 106 can include, but is not limited to, one or more sense channels 108, channel scan logic 110 and driver logic 114. Channel scan logic 110 can access RAM 112, autonomously read data from the sense channels and provide control for the sense channels. In addition, channel scan logic 110 can control driver logic 114 to generate stimulation signals 116 at various frequencies and phases that can be selectively applied to rows of touch sensor panel 124. In some embodiments, panel subsystem 106, panel processor 102 and peripherals 104 can be integrated into a single application specific integrated circuit (ASIC).

Touch sensor panel 124 can include a capacitive sensing medium having a plurality of row traces or driving lines and a plurality of column traces or sensing lines, although other sensing media can also be used. The row and column traces can be formed from a transparent conductive medium such as Indium Tin Oxide (ITO) or Antimony Tin Oxide (ATO), although other transparent and non-transparent materials such as copper can also be used. In some embodiments, the row and column traces can be perpendicular to each other, although in other embodiments other non-Cartesian orientations are possible. For example, in a polar coordinate system, the sensing lines can be concentric circles and the driving lines can be radially extending lines (or vice versa). It should be understood, therefore, that the terms "row" and "column," "first dimension" and "second dimension," or "first axis" and "second axis" as used herein are intended to encompass not only orthogonal grids, but the intersecting traces of other geometric configurations having first and second dimensions (e.g. the concentric and radial lines of a polar-coordinate arrangement). The rows and columns can be formed on a single side of a substantially transparent substrate separated by a substantially transparent dielectric material, on opposite sides of the substrate, or on two separate substrates separated by the dielectric material.

At the "intersections" of the traces, where the traces pass above and below (cross) each other (but do not make direct electrical contact with each other), the traces can essentially form two electrodes (although more than two traces could intersect as well). Each intersection of row and column traces can represent a capacitive sensing node and can be viewed as picture element (pixel) 126, which can be particularly useful when touch sensor panel 124 is viewed as capturing an "image" of touch. (In other words, after panel subsystem 106 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) The capacitance between row and column electrodes appears as a stray capacitance when the given row is held at direct current (DC) voltage levels and as a mutual signal capacitance Csig when the given row is stimulated with an alternating current (AC) signal. The presence of a finger or other object near or on the touch sensor panel can be detected by measuring changes to a signal charge Qsig present at the pixels being touched, which is a function of Csig. Each column of touch sensor panel 124 can drive sense channel 108 (also referred to herein as an event detection and demodulation circuit) in panel subsystem 106.

Computing system 100 can also include host processor 128 for receiving outputs from panel processor 102 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 can also perform additional functions that may not be related to panel processing, and can be coupled to program storage 132 and display device 130 such as an LCD display for providing a UI to a user of the device.

In some systems, sensor panel 124 can be driven by high-voltage driver logic. The high voltages that can be required by the high-voltage driver logic (e.g. 18V) can force the high-voltage driver logic to be formed separate from panel subsystem 106, which can operate at much lower digital logic voltage levels (e.g. 1.7 to 3.3V). However, in embodiments of the invention, on-chip driver logic 114 can replace the off-chip high voltage driver logic. Although panel subsystem 106 can have low, digital logic level supply voltages, on-chip driver logic 114 can generate a supply voltage greater that the digital logic level supply voltages by cascoding two transistors together to form charge pump 115. Charge pump 115 can be used to generate stimulation signals 116 (Vstim) that can have amplitudes of about twice the digital logic level supply voltages (e.g. 3.4 to 6.6V). Although FIG. 1 shows charge pump 115 separate from driver logic 114, the charge pump can be part of the driver logic.

Figure 2A:
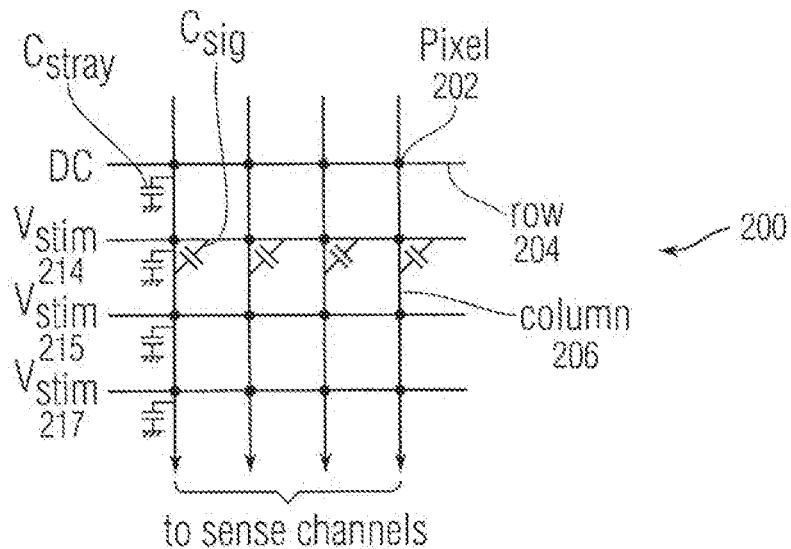
FIG. 2a illustrates an exemplary mutual capacitance touch sensor panel according to one embodiment of this invention.

FIG. 2a illustrates exemplary mutual capacitance touch sensor panel 200 according to embodiments of the invention. FIG. 2a indicates the presence of a stray capacitance Cstray at each pixel 202 located at the intersection of a row 204 and a column 206 trace (although Cstray for only one column is illustrated in FIG. 2a for purposes of simplifying the figure). In the example of FIG. 2a, AC stimuli Vstim 214, Vstim 215 and Vstim 217 can be applied to several rows, while other rows can be connected to DC. Vstim 214, Vstim 215 and Vstim 217 can be at different frequencies and phases, as will be explained later. Each stimulation signal on a row can cause a charge Qsig=Csig×Vstim to be injected into the columns through the mutual capacitance present at the affected pixels. A change in the injected charge (Qsig_sense) can be detected when a finger, palm or other object is present at one or more of the affected pixels. Vstim signals 214, 215 and 217 can include one or more bursts of sine waves. Note that although FIG. 2a illustrates rows 204 and columns 206 as being substantially perpendicular, they need not be so aligned, as described above. As described above, each column 206 can be connected to a sense channel (see sense channels 108 in FIG. 1).

Figure 2B:
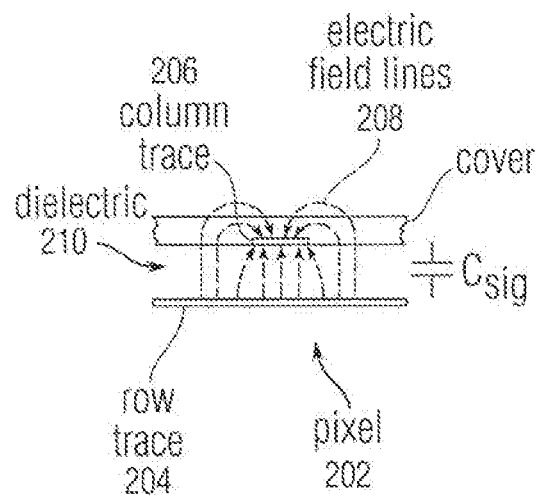
FIG. 2b is a side view of an exemplary pixel in a steady-state (no-touch) condition according to one embodiment of this invention.

FIG. 2b is a side view of exemplary pixel 202 in a steady-state (no-touch) condition according to embodiments of the invention. In FIG. 2b, an electric field of electric field lines 208 of the mutual capacitance between column 206 and row 204 traces or electrodes separated by dielectric 210 is shown.

Figure 2C:
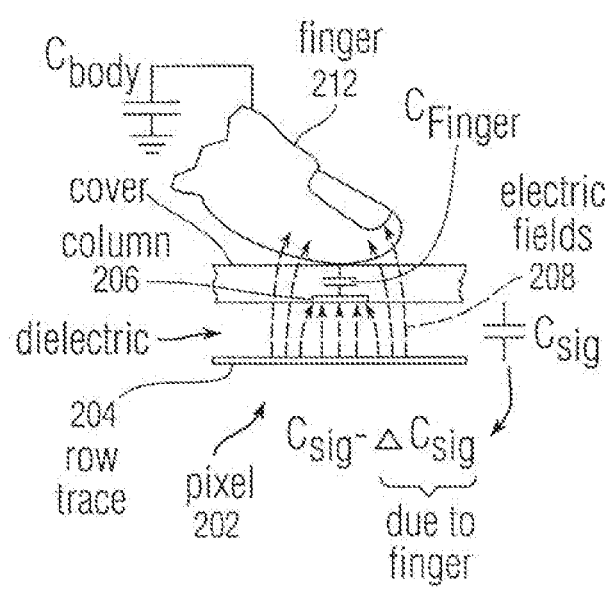
FIG. 2c is a side view of an exemplary pixel in a dynamic (touch) condition according to one embodiment of this invention.

FIG. 2c is a side view of exemplary pixel 202 in a dynamic (touch) condition. In FIG. 2c, finger 212 has been placed near pixel 202. Finger 212 is a low-impedance object at signal frequencies, and has an AC capacitance Cfinger from the column trace 206 to the body. The body has a self-capacitance to ground Cbody of about 200 pF, where Cbody is much larger than Cfinger. If finger 212 blocks some electric field lines 208 between the row and column electrodes (those fringing fields that exit the dielectric and pass through the air above the row electrode), those electric field lines are shunted to ground through the capacitance path inherent in the finger and the body, and as a result, the steady state signal capacitance Csig is reduced by ΔCsig. In other words, the combined body and finger capacitance act to reduce Csig by an amount ΔCsig (which can also be referred to herein as Csig_sense), and can act as a shunt or dynamic return path to ground, blocking some of the electric fields as resulting in a reduced net signal capacitance. The signal capacitance at the pixel becomes Csig−ΔCsig, where Csig represents the static (no touch) component and ΔCsig represents the dynamic (touch) component. Note that Csig−

ΔCsig may always be nonzero due to the inability of a finger, palm or other object to block all electric fields, especially those electric fields that remain entirely within the dielectric material. In addition, it should be understood that as a finger is pushed harder or more completely onto the multi-touch panel, the finger can tend to flatten, blocking more and more of the electric fields, and thus ΔCsig can be variable and representative of how completely the finger is pushing down on the panel (i.e. a range from "no-touch" to "full-touch").

Figure 3A:
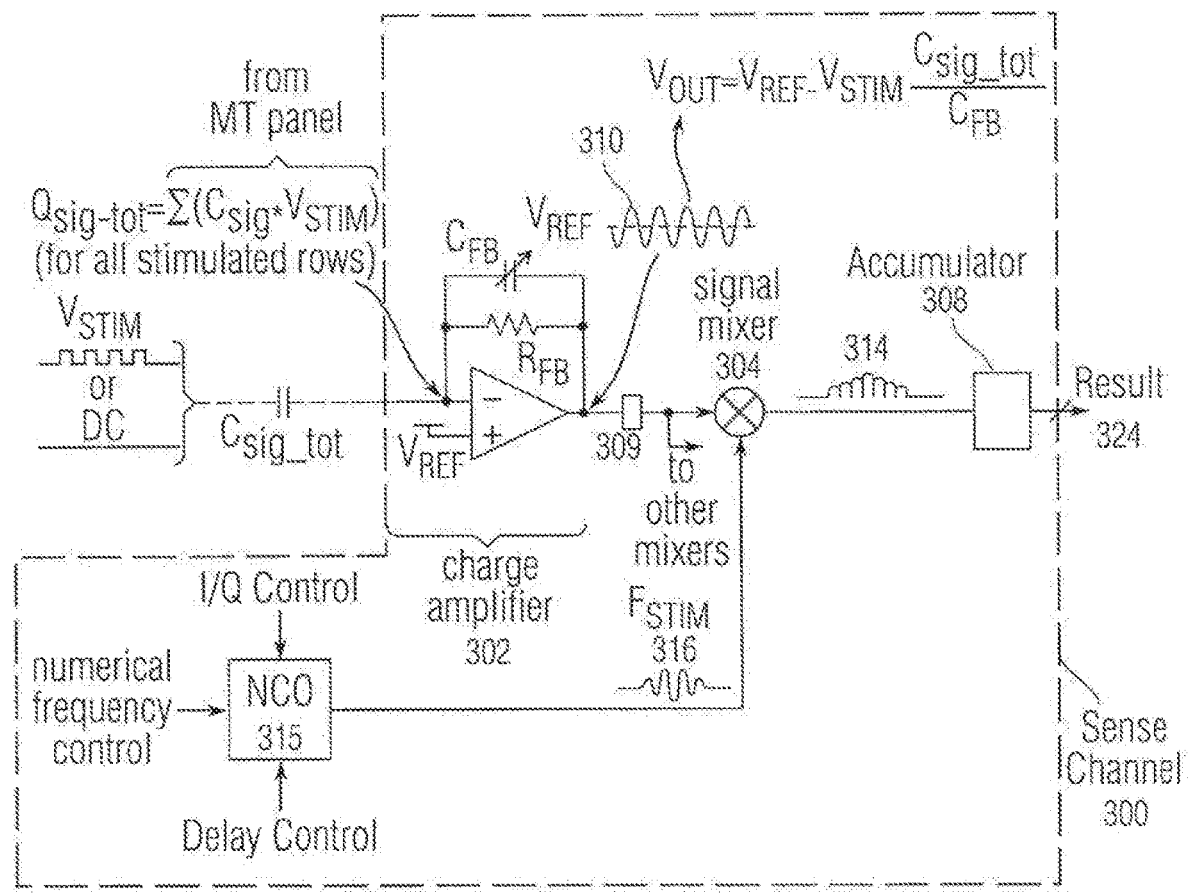
FIG. 3a illustrates a portion of an exemplary sense channel or event detection and demodulation circuit according to one embodiment of this invention.

FIG. 3a illustrates a portion of exemplary sense channel or event detection and demodulation circuit 300 according to embodiments of the invention. One or more sense channels 300 can be present in the panel subsystem. Each column from a touch sensor panel can be connected to sense channel 300. Each sense channel 300 can include virtual-ground amplifier 302, amplifier output circuit 309 (to be explained in greater detail below), signal mixer 304, and accumulator 308. Note that amplifier output circuit 309 can also be connected to other signal mixers and associated circuitry not shown in FIG. 3a to simplify the figure.

Virtual-ground amplifier 302, which can also be referred to as a DC amplifier or a charge amplifier, can include feedback capacitor Cfb and feedback resistor Rfb. In some embodiments, because of the much smaller amount of charge that can be injected into a row due to lower Vstim amplitudes, Cfb can be made much smaller than in some previous designs. However, in other embodiments, because as many as all rows can be simultaneously stimulated at the same time, which tends to add charge, Cfb is not reduced in size.

FIG. 3a shows, in dashed lines, the total steady-state signal capacitance Csig_tot that can be contributed by a touch sensor panel column connected to sense channel 300 when one or more input stimuli Vstim are applied to one or more rows in the touch sensor panel and no finger, palm or other object is present. In a steady-state, no-touch condition, the total signal charge Qsig_tot injected into the column is the sum of all charge injected into the column by each stimulated row. In other words, Qsig_tot=Σ(Csig*Vstim for all stimulated rows). Each sense channel coupled to a column can detect any change in the total signal charge due to the presence of a finger, palm or other body part or object at one or more pixels in that column. In other words, Qsig_tot_sense=Σ((Csig−Csig_sense)*Vstim for all stimulated rows).

As noted above, there can be an inherent stray capacitance Cstray at each pixel on the touch sensor panel. In virtual ground charge amplifier 302, with the + (noninverting) input tied to reference voltage Vref, the − (inverting) input can also be driven to Vref, and a DC operating point can be established. Therefore, regardless of how much Csig is present at the input to virtual ground charge amplifier 302, the − input can always be driven to Vref. Because of the characteristics of virtual ground charge amplifier 302, any charge Qstray that is stored in Cstray is constant, because the voltage across Cstray is kept constant by the charge amplifier. Therefore, no matter how much stray capacitance Cstray is added to the − input, the net charge into Cstray will always be zero. The input charge is accordingly zero when the corresponding row is kept at DC and is purely a function of Csig and Vstim when the corresponding row is stimulated. In either case, because there is no charge across Csig, the stray capacitance is rejected, and it essentially drops out of any equations. Thus, even with a hand over the touch sensor panel, although Cstray can increase, the output will be unaffected by the change in Cstray.

The gain of virtual ground amplifier 302 can be small (e.g. 0.1) and can be computed as the ratio of Csig_tot and feedback capacitor Cfb. The adjustable feedback capacitor Cfb can convert the charge Qsig to the voltage Vout. The output Vout of virtual ground amplifier 302 is a voltage that can be computed as the ratio of −Csig/Cfb multiplied by Vstim referenced to Vref. The Vstim signaling can therefore appear at the output of virtual ground amplifier 302 as signals having a much smaller amplitude. However, when a finger is present, the amplitude of the output can be even further reduced, because the signal capacitance is reduced by ΔCsig. The output of charge amplifier 302 is the superposition of all row stimulus signals multiplied by each of the Csig values on the column associated with that charge amplifier. A column can have some pixels which are driven by a frequency at positive phase, and simultaneously have other pixels which are driven by that same frequency at negative phase (or 180 degrees out of phase). In this case, the total component of the charge amplifier output signal at that frequency can be the amplitude and phase associated with the sum of the product of each of the Csig values multiplied by each of the stimulus waveforms. For example, if two rows are driven at positive phase, and two rows are driven at negative phase, and the Csig values are all equal, then the total output signal will be zero. If the finger gets near one of the pixels being driven at positive phase, and the associated Csig reduces, then the total output at that frequency will have negative phase.

Vstim, as applied to a row in the touch sensor panel, can be generated as a burst of sine waves (e.g. sine waves with smoothly changing amplitudes in order to be spectrally narrow) or other non-DC signaling in an otherwise DC signal, although in some embodiments the sine waves representing Vstim can be preceded and followed by other non-DC signaling. If Vstim is applied to a row and a signal capacitance is present at a column connected to sense channel 300, the output of charge amplifier 302 associated with that particular stimulus can be sine wave train 310 centered at Vref with a peak-to-peak (p-p) amplitude in the steady-state condition that can be a fraction of the p-p amplitude of Vstim, the fraction corresponding to the gain of charge amplifier 302. For example, if Vstim includes 6.6V p-p sine waves and the gain of the charge amplifier is 0.1, then the output of the charge amplifier associated with this row can be approximately 0.67V p-p sine wave. In should be noted that the signal from all rows are superimposed at the output of the preamp. The analog output from the preamp is converted to digital in block 309. The output from 309 can be mixed in digital signal mixer 304 (which is a digital multiplier) with demodulation waveform Fstim 316.

Because Vstim can create undesirable harmonics, especially if formed from square waves, demodulation waveform Fstim 316 can be a Gaussian sine wave that can be digitally generated from numerically controlled oscillator (NCO) 315 and synchronized to Vstim. It should be understood that in addition to NCOs 315, which are used for digital demodulation, independent NCOs can be connected to digital-to-analog converters (DACs), whose outputs can be optionally inverted and used as the row stimulus. NCO 315 can include a numerical control input to set the output frequency, a control input to set the delay, and a control input to enable the NCO to generate an in-phase (I) or quadrature (Q) signal. Signal mixer 304 can demodulate the output of charge amplifier 310 by subtracting Fstim 316 from the output to provide better noise rejection. Signal mixer 304 can reject all frequencies outside the passband, which can in one example be about +/−30 kHz around Fstim. This noise rejection can be beneficial in noisy environment with many sources of noise, such as 802.11, Bluetooth and the like, all having some characteristic frequency that can interfere with the sensitive (femtofarad level) sense channel 300. For each frequency of interest being demodulated, signal mixer 304 is essentially a synchronous rectifier as the frequency of the signal at its inputs is the same, and as a result, signal mixer output 314 is essentially a rectified Gaussian sine wave.

Figure 3B:
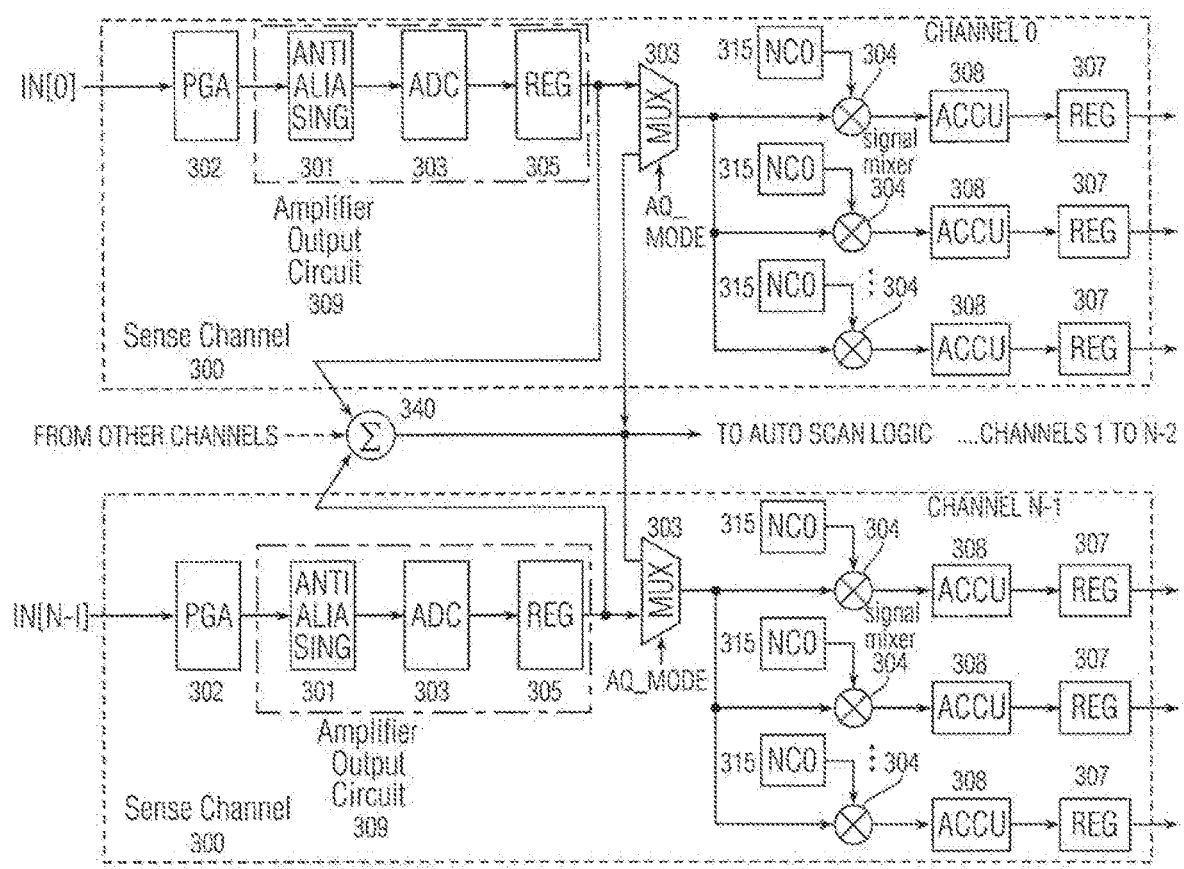
FIG. 3b illustrates a simplified block diagram of N exemplary sense channel or event detection and demodulation circuits according to one embodiment of this invention.

FIG. 3*b* illustrates a simplified block diagram of N exemplary sense channel or event detection and demodulation circuits 300 according to embodiments of the invention. As noted above, each charge amplifier or programmable gain amplifier (PGA) 302 in sense channel 300 can be connected to amplifier output circuit 309, which in turn can be connected to R signal mixers 304 through multiplexer 303. Amplifier output circuit 309 can include anti-aliasing filter 301, ADC 303, and result register 305. Each signal mixer 304 can be demodulated with a signal from a separate NCO 315. The demodulated output of each signal mixer 304 can be connected to a separate accumulator 308 and results register 307.

It should be understood that PGA 302, which may have detected a higher amount of charge generated from a high-voltage Vstim signal (e.g. 18V) in previous designs, can now detect a lower amount of charge generated from a lower voltage Vstim signal (e.g. 6.6V). Furthermore, NCOs 315 can cause the output of charge amplifier 302 to be demodulated simultaneously yet differently, because each NCO 310 can generate signals at different frequencies, delays and phases. Each signal mixer 304 in a particular sense channel 300 can therefore generate an output representative of roughly one-Rth the charge of previous designs, but because there are R mixers, each demodulating at a different frequency, each sense channel can still detect about the same total amount of charge as in previous designs.

In FIG. 3*b*, signal mixers 304 and accumulators 308 can be implemented digitally instead of in analog circuitry inside an ASIC. Having the mixers and accumulators implemented digitally instead of in analog circuitry inside the ASIC can save about 15% in die space.

Figure 3C:
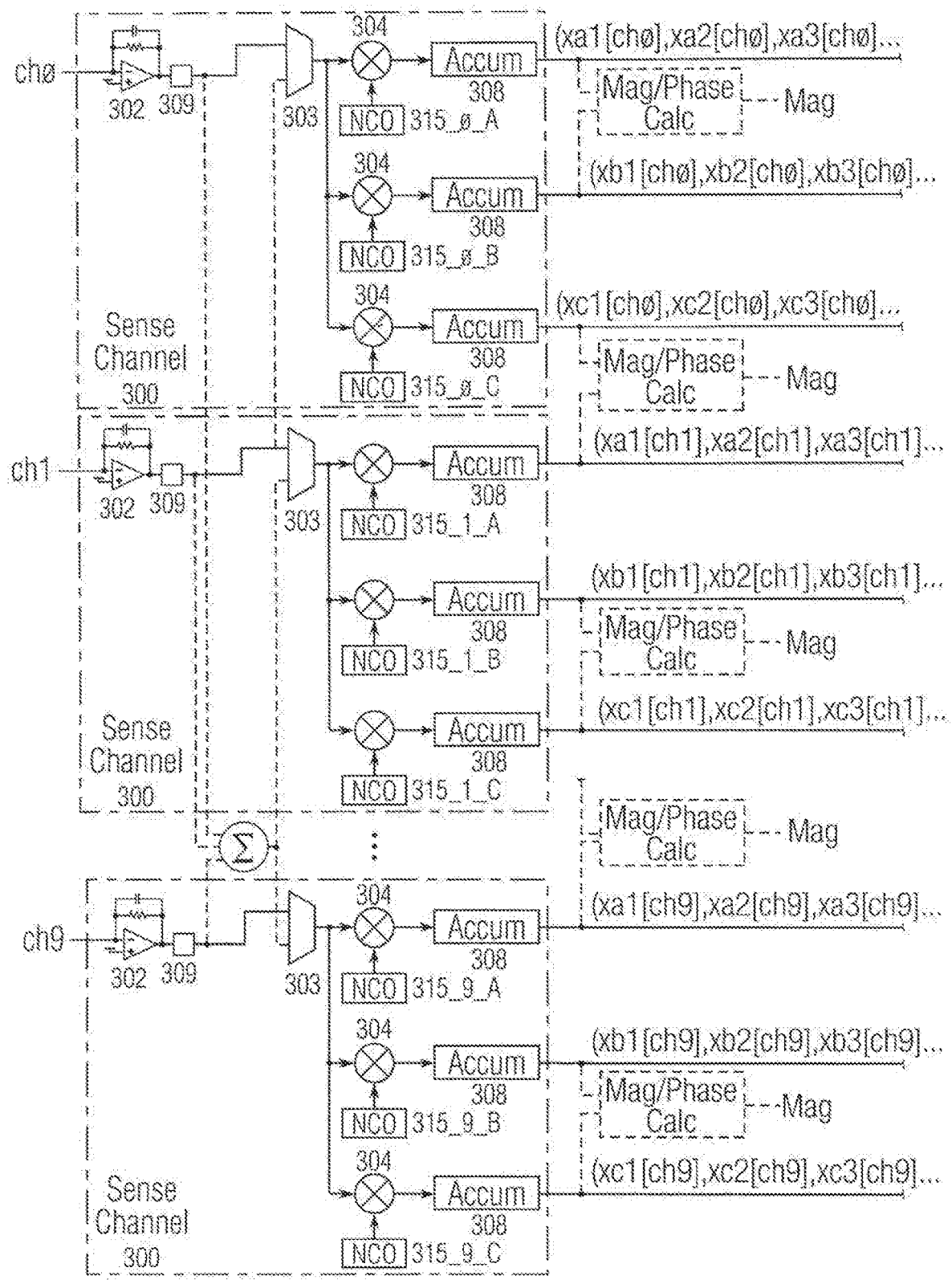
FIG. 3c illustrates an exemplary block diagram of 10 sense channels that can be configured either as a spectrum analyzer or as panel scan logic according to one embodiment of this invention.

FIG. 3*c* illustrates an exemplary block diagram of 10 sense channels 300 that can be configured either as a spectrum analyzer or as panel scan logic according to embodiments of the invention. In the example of FIG. 3*c*, each of 10 sense channels 300 can be connected to a separate column in a touch sensor panel. Note that each sense channel 300 can include multiplexer or switch 303, to be explained in further detail below. The solid-line connections in FIG. 3*c* can represent the sense channels configured as panel scan logic, and the dashed-line connections can represent the sense channels configured as a spectrum analyzer. FIG. 3*c* will be discussed in greater detail hereinafter.

Figure 4A:
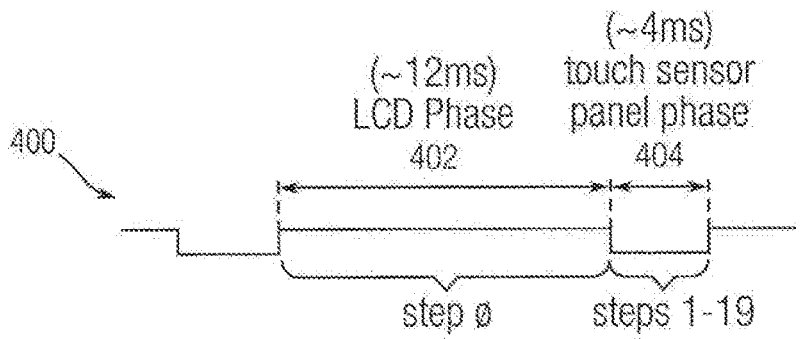
FIG. 4a illustrates an exemplary timing diagram showing an LCD phase and touch sensor panel phase according to one embodiment of this invention.

FIG. 4*a* illustrates exemplary timing diagram 400 showing LCD phase 402 and the vertical blanking or touch sensor panel phase 404 according to embodiments of the invention. During LCD phase 402, the LCD can be actively switching and can be generating voltages needed to generate images. No panel scanning is performed at this time. During touch sensor panel phase 404, the sense channels can be configured as a spectrum analyzer to identify low noise frequencies, and can also be configured as panel scan logic to detect and locate an image of touch.

Figure 4B:
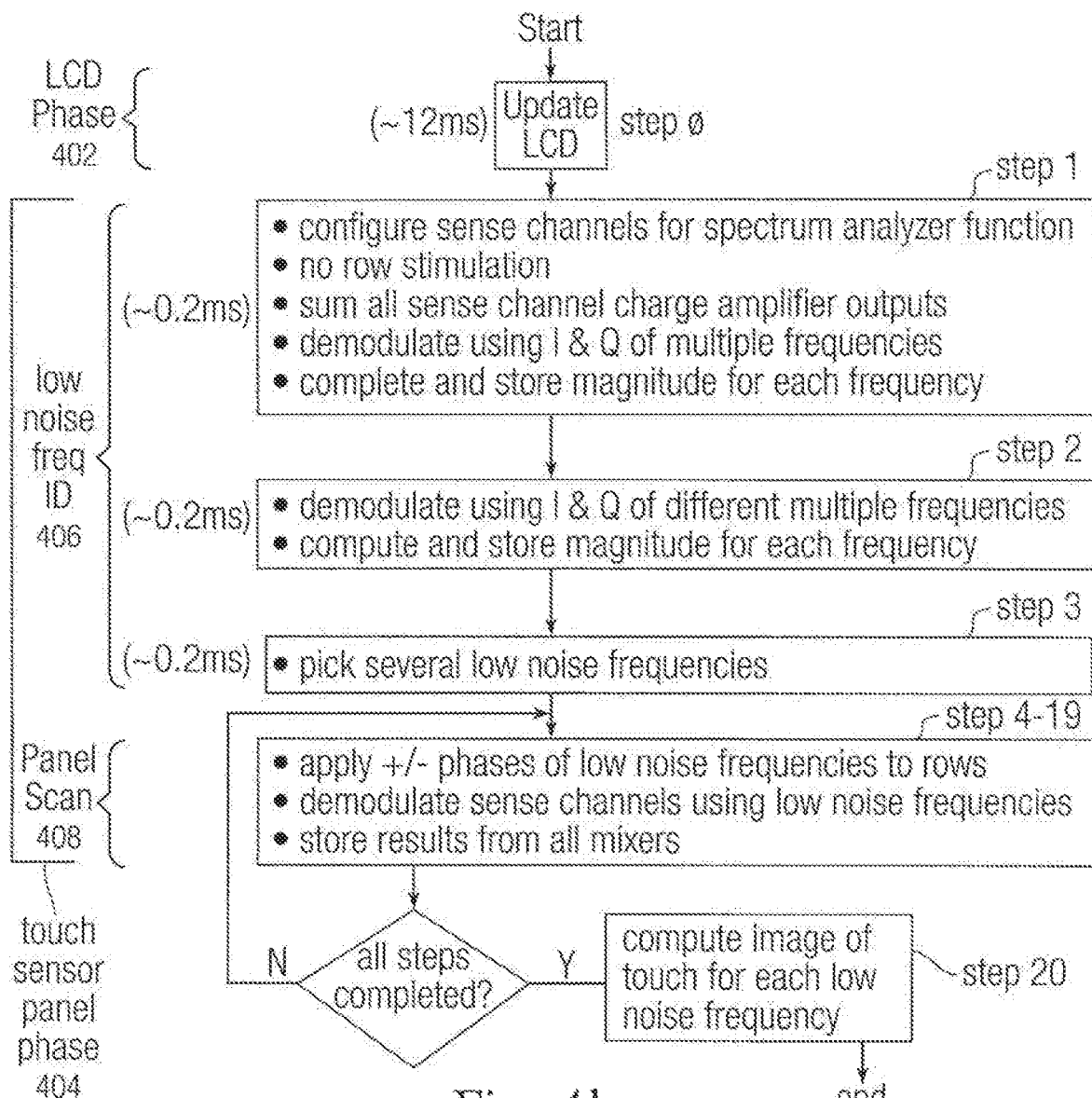
FIG. 4b illustrates an exemplary flow diagram describing the LCD phase and the touch sensor panel phase according to one embodiment of this invention.

FIG. 4*b* illustrates exemplary flow diagram 406 describing LCD phase 402 and touch sensor panel phase 404 corresponding to the example of FIG. 3*c* (the present example) according to embodiments of the invention. In Step 0, the LCD can be updated as described above.

Steps 1-3 can represent a low noise frequency identification phase 406. In Step 1, the sense channels can be configured as a spectrum analyzer. The purpose of the spectrum analyzer is to identify several low noise frequencies for subsequent use in a panel scan. With no stimulation frequencies applied to any of the rows of the touch sensor panel, the sum of the output of all sense channels, which represent the total charge being applied to the touch sensor panel including all detected noise, can be fed back to each of the mixers in each sense channel. The mixers can be paired up, and each pair of mixers can demodulate the sum of all sense channels using the in-phase (I) and quadrature (Q) signals of a particular frequency. The demodulated outputs of each mixer pair can be used to calculate the magnitude of the noise at that particular frequency, wherein the lower the magnitude, the lower the noise at that frequency.

In Step 2, the process of Step 1 can be repeated for a different set of frequencies.

In Step 3, several low noise frequencies can be selected for use in a subsequent touch sensor panel scan by identifying those frequencies producing the lowest calculated magnitude value.

Steps 4-19 can represent a panel scan phase 408. In Steps 4-19, the sense channels can be configured as panel scan logic. At each of Steps 4-19, various phases of the selected low noise frequencies can be used to simultaneously stimulate the rows of the touch sensor panel, and the multiple mixers in each sense channel can be configured to demodulate the signal received from the column connected to each sense channel using the selected low noise frequencies. The demodulated signals from the multiple mixers can then be saved.

In Step 20, after all steps have been completed, the saved results can be used in calculations to determine an image of touch for the touch sensor panel at each of the selected low noise frequencies.

Referring again to the present example as shown in FIG. 3*c*, while sense channels 300 are configured as a spectrum analyzer, no stimulation signal is applied to any of the rows in the touch sensor panel. In the present example, there are 10 columns and therefore 10 sense channels 300, and three mixers 304 for each sense channel 300, for a total of 30 mixers. The outputs of all amplifier output circuits 309 in every sense channel 300 can be summed together using summing circuit 340, and fed into all mixers 304 through multiplexer or switch 303, which can be configured to select the output of summing circuit 340 instead of charge amplifier 302.

While the sense channels are configured as a spectrum analyzer, the background coupling onto the columns can be measured. Because no Vstim is applied to any row, there is no Csig at any pixel, and any touches on the panel should not affect the noise result (unless the touching finger or other object couples noise onto ground). By adding all outputs of all amplifier output circuits 309 together in adder 340, one digital bitstream can be obtained representing the total noise being received into the touch sensor panel. The frequencies of the noise and the pixels at which the noise is being generated are not known prior to spectrum analysis, but do become known after spectrum analysis has been completed. The pixel at which the noise is being generated is not known and is not recovered after spectrum analysis, but because the bitstream is being used as a general noise collector, they need not be known.

While configured as a spectrum analyzer, the 30 mixers in the example of FIG. 3*c* can be used in 15 pairs, each pair demodulating the I and Q signals for 15 different frequencies as generated by NCOs 315. These frequencies can be between 200 kHz and 300 kHz, for example. NCOs 315 can produce a digital rampsine wave that can be used by digital mixers 304 to demodulate the noise output of summing circuit 340. For example, NCO 315_0_A can generate the I component of frequency F0, while NCO 315_0_B can generate the Q component of F0. Similarly, NCO 315_0_C can generate the I component of frequency F1, NCO 315_1_A can generate the Q component of F1, NCO 315_1_B can generate the I component of frequency F2, NCO 315_1_C can generate the Q component of F2, etc.

The output of summing circuit 340 (the noise signal) can then be demodulated by the I and Q components of F0 through F14 using the 15 pairs of mixers. The result of each mixer 304 can be accumulated in accumulators 308. Each accumulator 308 can be a digital register that, over a sample time period, can accumulate (add together) the instantaneous values from mixer 304. At the end of the sample time period, the accumulated value represents the amount of noise signal at that frequency and phase.

The accumulated results of an I and Q demodulation at a particular frequency can represent the amount of content at that frequency that is either in phase or in quadrature. These two values can then be used in magnitude and phase calculation circuit 342 to find the absolute value of the total magnitude (amplitude) at that frequency. A higher magnitude can mean a higher background noise level at that frequency. The magnitude value computed by each magnitude and phase calculation circuit 342 can be saved. Note that without the Q component, noise that was out of phase with the demodulation frequency can remain be undetected.

This entire process can be repeated for 15 different frequencies F15-F29. The saved magnitude values for each of the 30 frequencies can then be compared, and the three frequencies with the lowest magnitude values (and therefore the lowest noise levels), referred to herein as frequencies A, B and C, can be chosen. In general, the number of low noise frequencies chosen can correspond to the number of mixers in each sense channel.

Still referring to FIG. 3c, when sense channels 300 are configured as panel scan logic, the dashed lines in FIG. 3c can be ignored. At each of Steps 4-19, various phases of the selected low noise frequencies can be used to simultaneously stimulate the rows of the touch sensor panel, and the multiple mixers in each sense channel can be configured to demodulate the signal received from the column connected to each sense channel using the selected low noise frequencies A, B and C. In the example of FIG. 3c, NCO_0_A can generate frequency A, NCO_0_B can generate frequency B, NCO_0_C can generate frequency C, NCO_1_A can generate frequency A, NCO_1_B can generate frequency B, NCO_1_C can generate frequency C, etc. The demodulated signals from each mixer 304 in each sense channel can then be accumulated in accumulators 308, and saved.

In general, the R mixer outputs for any sense channel M (where M=0 to N−1) demodulated by R low noise frequencies $F_0, F_1 \ldots F_{R-1}$ can be represented by the notation $xF_0S[chM], xF_1S[chM] \ldots xF_{R-1}S[chM]$, where $xF_0$ represents the output of a mixer demodulated with frequency $F_0$, $xF_1$ represents the output of a mixer demodulated with frequency $F_1$, $xF_{R-1}$ represents the output of a mixer demodulated with frequency $F_{R-1}$, and S represents the sequence number in the panel scan phase.

Therefore, in Step 4 (representing sequence number 1 in the panel scan phase), and using low noise frequencies A, B and C as the demodulation frequencies, the outputs to be saved can be referred to as xa1[ch0], xb1[ch0], xc1[ch0], xa1[ch1], xb1[ch1], xc1[ch1], . . . xa1[ch9], xb1[ch9], xc1[ch9]. Thus, in the present example, 30 results are saved in Step 4. In Step 5 (representing sequence number 2 in the panel scan phase), the 30 results to be saved can be referred to as xa2[ch0], xb2[ch0], xc2[ch0], xa2[ch1], xb2[ch1], xc2[ch1], . . . xa2[ch9], xb2[ch9], xc2[ch9]. The 30 outputs to be saved in each of Steps 6-19 can be similarly named.

It should be understood that the additional logic outside the sense channels in FIG. 3c can be implemented in the channel scan logic 110 of FIG. 1, although it could also be located elsewhere.

FIG. 4c illustrates an exemplary capacitive scanning plan 410 corresponding to the present example according to embodiments of the invention. FIG. 4c describes Steps 0-19 as shown in FIG. 4b for an exemplary sensor panel having 15 rows R0-R14.

Step 0 can represent the LCD phase at which time the LCD can be updated. The LCD phase can take about 12 ms, during which time no row can be stimulated.

Steps 1-19 can represent the vertical blanking interval for the LCD, during which time the LCD is not changing voltages.

Steps 1-3 can represent the low noise frequency identification phase which can take about 0.6 ms, again during which time no row can be stimulated. In Step 1, the I and Q components of different frequencies ranging from 200 kHz to 300 kHz (separated by at least 10 kHz) can be simultaneously applied to pairs of mixers in the sense channels configured as a spectrum analyzer, and a magnitude of the noise at those frequencies can be saved. In Step 2, the I and Q components of different frequencies ranging from 300 kHz to 400 kHz can be simultaneously applied to pairs of mixers in the sense channels configured as a spectrum analyzer, and a magnitude of the noise at those frequencies can be saved. In Step 3, the lowest noise frequencies A, B and C can be identified by locating the frequencies that produced the lowest saved magnitudes. The identification of the lowest noise frequencies can be done solely on the measured spectra measured in steps 1 and 2, or it can also take into account historical measurements from steps 1 and 2 of previous frames.

Steps 4-19 can represent the panel scan phase which can take about 3.4 ms.

In Step 4, which can take about 0.2 ms, positive and negative phases of A, B and C can be applied to some rows, while other rows can be left unstimulated. It should be understood that +A can represent scan frequency A with a positive phase, −A can represent scan frequency A with a negative phase, +B can represent scan frequency B with a positive phase, −B can represent scan frequency B with a negative phase, +C can represent scan frequency C with a positive phase, and −C can represent scan frequency C with a negative phase. The charge amplifiers in the sense channels coupled to the columns of the sensor panel can detect the total charge coupled onto the column due to the rows being stimulated. The output of each charge amplifier can be demodulated by the three mixers in the sense channel, each mixer receiving either demodulation frequency A, B or C. Results or values xa1, xb1 and xc1 can be obtained and saved, where xa1, xb1 and xc1 are vectors. For example, xa1 can be a vector with 10 values xa1 [ch0], xa1 [ch1], xa1 [ch2] . . . xa1[ch9], xb1 can be a vector with 10 values xb1[ch0], xb1[ch1], xb1[ch2] . . . xb1[ch9], and xc1 can be a vector with 10 values xc1 [ch0], xc1[ch1], xc1 [ch2] . . . xc1 [ch9].

In particular, in Step 4, +A is applied to rows 0, 4, 8 and 12, +B, −B, +B and −B are applied to rows 1, 5, 9 and 13, respectively, +C, −C, +C and −C are applied to rows 2, 6, 10 and 14, respectively, and no stimulation is applied to rows 3, 7, 11 and 15. The sense channel connected to column 0 senses the charge being injected into column 0 from all stimulated rows, at the noted frequencies and phases. The three mixers in the sense channel can now be set to demodulate A, B and C, and three different vector results xa1, xb1 and xc1 can be obtained for the sense channel. Vector xa1, for example, can represent the sum of the charge injected into columns 0-9 at the four rows being stimulated by +A (e.g. rows 0, 4, 8 and 12). Vector xa1 does not provide complete information, however, as the particular row at which a touch occurred is still unknown. In parallel, in the same Step 4, rows 1 and 5 can be stimulated with +B, and rows 9 and 13 can be stimulated with −B, and vector xb1 can represent the sum of the charge injected into columns 0-9 at the rows being stimulated by +B and −B (e.g. rows 1, 5, 9 and 13). In parallel, in the same Step 4, rows 2 and 14 can be stimulated with +C, and rows 6 and 10 can be stimulated with −C, and vector xc1 can represent the sum of the charge injected into columns 0-9 at the rows being stimulated by +C and −C (e.g. rows 2, 6, 10 and 14). Thus, at the conclusion of Step 4, three vectors containing 10 results each, for a total of 30 results, are obtained and stored.

Steps 5-19 are similar to Step 4, except that different phases of A, B and C can be applied to different rows, and different vector results are obtained at each step. At the conclusion of Step 19, a total of 480 results will have been obtained in the example of FIG. 4c. By obtaining the 480 results at each of Steps 4-19, a combinatorial, factorial approach is used wherein incrementally, for each pixel, information is obtained regarding the image of touch for each of the three frequencies A, B and C.

It should be noted that Steps 4-19 illustrate a combination of two features, multi-phase scanning and multi-frequency scanning. Each feature can have its own benefit. Multi-frequency scanning can save time by a factor of three, while multi-phase scanning can provide a better signal-to-noise ratio (SNR) by about a factor of two.

Multi-phase scanning can be employed by simultaneously stimulating most or all of the rows using different phases of multiple frequencies. Multi-phase scanning is described in Applicant's co-pending U.S. application Ser. No. 11/619, 433 entitled "Simultaneous Sensing Arrangement," filed on Jan. 3, 2007, the contents of which are incorporated by reference herein. One benefit of multi-phase scanning is that more information can be obtained from a single panel scan. Multi-phase scanning can achieve a more accurate result because it minimizes the possibility of inaccuracies that can be produced due to certain alignments of the phases of the stimulation frequency and noise.

In addition, multi-frequency scanning can be employed by simultaneously stimulating most or all of the rows using multiple frequencies. As noted above, multi-frequency scanning saves time. For example, in some previous methods, 15 rows can be scanned in 15 steps at frequency A, then the 15 rows can be scanned in 15 steps at frequency B, then the 15 rows can be scanned in 15 steps at frequency C, for a total of 45 steps. However, using multi-frequency scanning as shown in the example of FIG. 4c, only a total of 16 steps (Steps 4 through Step 19) can be required. Multi-frequency in its simplest embodiment can include simultaneously scanning R0 at frequency A, R1 at frequency B, and R2 at frequency C in a first step, then simultaneously scanning R1 at frequency A, R2 at frequency B, and R3 at frequency C in step 2, etc. for a total of 15 steps.

At the conclusion of Steps 4-19, when the 480 results described above have been obtained and stored, additional calculations can be performed utilizing these 480 results.

FIG. 4d illustrates exemplary calculations for a particular channel M to compute full image results at different low noise frequencies corresponding to the present example according to embodiments of the invention. In the present example, for each channel M, where M=0 to 9, the 45 computations shown in FIG. 4d can be performed to obtain a row result for each row and each frequency A, B and C. Each set of 45 computations for each channel can generate a resultant pixel value for the column of pixels associated with that channel. For example, the Row 0, frequency A computation (xa1[chM]+xa2[chM]+xa3[chM]+xa4 [chM])/4 can generate the row 0, channel M result for frequency A. In the present example, after all computations have been performed and stored for every channel, a total of 450 results will have been obtained. These computations correspond to Step 20 of FIG. 4b.

Of these 450 results, there will be 150 for frequency A, 150 for frequency B, and 150 for frequency C. The 150 results for a particular frequency represent an image map or image of touch at that frequency because a unique value is provided for each column (i.e. channel) and row intersection. These touch images can then be processed by software that synthesizes the three images and looks at their characteristics to determine which frequencies are inherently noisy and which frequencies are inherently clean. Further processing can then be performed. For example, if all three frequencies A, B and C are all relatively noise-free, the results can be averaged together.

It should be understood that the computations shown in FIGS. 4c and 4d can be performed under control of panel processor 102 or host processor 128 of FIG. 1, although they could also be performed elsewhere.

Figure 5A:
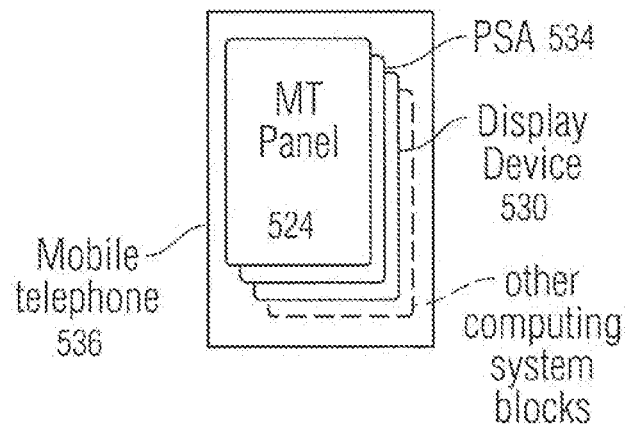
FIG. 5a illustrates an exemplary mobile telephone that can utilize multiple digital mixers to perform spectrum analysis of noise and identify low noise stimulation frequencies, and can utilize multiple stimulation frequencies and phases to detect and localize touch events on a touch sensor panel according to one embodiment of this invention.

FIG. 5a illustrates an exemplary mobile telephone 536 that can include touch sensor panel 524, display device 530 bonded to the sensor panel using pressure sensitive adhesive (PSA) 534, and other computing system blocks in computing system 100 of FIG. 1 for applying multiple stimulation frequencies and phases to the touch sensor panel to identify low noise stimulation frequencies and detect and localize touch events according to embodiments of the invention.

Figure 5B:
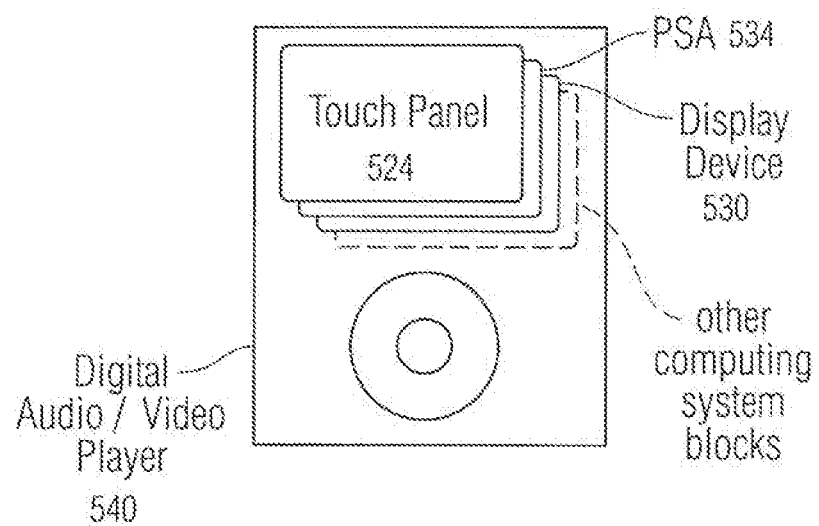
FIG. 5b illustrates an exemplary digital audio player that can utilize multiple digital mixers to perform spectrum analysis of noise and identify low noise stimulation frequencies, and can utilize multiple stimulation frequencies and phases to detect and localize touch events on a touch sensor panel according to one embodiment of this invention.

FIG. 5b illustrates an exemplary digital audio/video player 540 that can include touch sensor panel 524, display device 530 bonded to the sensor panel using pressure sensitive adhesive (PSA) 534, and other computing system blocks in computing system 100 of FIG. 1 for applying multiple stimulation frequencies and phases to the touch sensor panel to identify low noise stimulation frequencies and detect and localize touch events according to embodiments of the invention.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A touch sensor panel subsystem including a first sense channel, the first sense channel comprising:
   a first multiplexer configured to receive a first sense signal and a noise signal; and a plurality of first demodulators coupled to an output of the first multiplexer, each first demodulator selectively configurable for:
   when configured in a panel scan mode, demodulating the first sense signal with one of a plurality of first demodulation frequencies, and
   when configured in a spectrum analyzer mode, demodulating the noise signal with an in-phase (I) component or a quadrature (Q) component of one of a plurality of second demodulation frequencies.

2. The touch sensor panel subsystem of claim 1, wherein when the plurality of first demodulators in the first sense channel are configured in the spectrum analyzer mode, two of the plurality of first demodulators are configured to demodulate the noise signal with the I component and the Q component of a particular second demodulation frequency, respectively.

3. The touch sensor panel subsystem of claim 1, each of the plurality of first demodulators in the first sense channel comprising:
   a first mixer; and
   a first frequency source coupled to the first mixer;
   wherein each first frequency source is configurable to generate a different demodulation frequency.

4. The touch sensor panel subsystem of claim 1, the first sense channel configured for operating with a second sense channel in the touch sensor panel subsystem, the second sense channel comprising a plurality of second demodulators;
   wherein in the spectrum analyzer mode, one of the plurality of first demodulators and one of the plurality of second demodulators are configured to demodulate the noise signal with the I component and the Q component of a particular second demodulation frequency, respectively.

5. The touch sensor panel subsystem of claim 4, the second sense channel further comprising a second multiplexer configured to receive a second sense signal and the noise signal;
   wherein the plurality of second demodulators are coupled to an output of the second multiplexer, each second demodulator selectively configurable for:
      when configured in the panel scan mode, demodulating the second sense signal with one of the plurality of first demodulation frequencies, and
      when configured in the spectrum analyzer mode, demodulating the noise signal with the I component or the Q component of one of the plurality of second demodulation frequencies.

6. The touch sensor panel subsystem of claim 5, wherein when configured in the panel scan mode, the plurality of first demodulators of the first sense channel and the plurality of second demodulators of the second sense channel are configured for generating first and second touch signals from the first and second sense signals at each of the plurality of the first demodulation frequencies.

7. The touch sensor panel subsystem of claim 5, wherein when configured in the spectrum analyzer mode, the plurality of first demodulators of the first sense channel and the plurality of second demodulators of the second sense channel are configured for generating a plurality of demodulated noise signals at each of the plurality of the second demodulation frequencies.

8. A method of providing panel scan or spectrum analyzer functionality in a touch sensor panel subsystem, the method comprising:
   configuring a first sense channel of the touch sensor panel subsystem in either a panel scan mode or a spectrum analyzer mode;
   when the first sense channel is configured in the panel scan mode,
      receiving a first sense signal, and
      demodulating the first sense signal with each of a plurality of first demodulation frequencies; and
   when the first sense channel is configured in the spectrum analyzer mode,
      receiving a noise signal, and
      demodulating the noise signal with one or both of an in-phase (I) component and a quadrature (Q) component of each of a first subset of a plurality of second demodulation frequencies.

9. The method of claim 8, further comprising:
   when the first sense channel is configured in the spectrum analyzer mode, demodulating the noise signal with the I component and the Q component of a particular demodulation frequency in the first subset of the plurality of second demodulation frequencies.

10. The method of claim 8, further comprising:
   configuring a second sense channel of the touch sensor panel subsystem in the spectrum analyzer mode;
   demodulating the noise signal with one of the I component and the Q component of a particular demodulation frequency in the first subset of the plurality of second demodulation frequencies in the first sense channel; and
   demodulating the noise signal with the other of the I component and the Q component of the particular demodulation frequency in the first subset of the plurality of second demodulation frequencies in the second sense channel.

11. The method of claim 8, further comprising:
   configuring a second sense channel of the touch sensor panel subsystem in either the panel scan mode or the spectrum analyzer mode;
   when the second sense channel is configured in the panel scan mode,
      receiving a second sense signal, and
      demodulating the second sense signal with each of the plurality of first demodulation frequencies; and
   when the second sense channel is configured in the spectrum analyzer mode,
      receiving the noise signal, and
      demodulating the noise signal with one or both of an in-phase (I) component and a quadrature (Q) component of each of a second subset of the plurality of second demodulation frequencies.

12. The method of claim 11, further comprising:
   when the first sense channel and the second sense channel are configured in the panel scan mode, generating first and second touch signals from the first and second sense signals at each of the plurality of first demodulation frequencies.

13. The method of claim 11, further comprising:
   when the first sense channel and the second sense channel are configured in the spectrum analyzer mode, generating a plurality of demodulated noise signals at each of the first and second subsets of the plurality of second demodulation frequencies.

14. A touch sensor panel subsystem having panel scan and spectrum analyzer functionality, comprising:
   a plurality of sense channels, each sense channel having a plurality of demodulators;

wherein each sense channel is configurable in a panel scan mode to receive a sense signal from a touch sensor panel and demodulate the sense signal using the plurality of demodulators at a plurality of first demodulation frequencies; and wherein the plurality of demodulators across the plurality of sense channels are configurable in a spectrum analyzer mode to receive and demodulate a noise signal with an in-phase (I) component and a quadrature (Q) component of a plurality of second demodulation frequencies.

15. The touch sensor panel subsystem of claim 14, wherein at least one pair of the plurality of demodulators configured to demodulate with the I component and the Q component at one of the plurality of second demodulation frequencies includes a demodulator in a first sense channel and a demodulator in a second sense channel.

16. The touch sensor panel subsystem of claim 14, each sense channel comprising:

a first multiplexer configured to receive a first sense signal and the noise signal; and a plurality of first demodulators coupled to an output of the first multiplexer, each first demodulator selectively configurable for:

when configured in the panel scan mode, demodulating the first sense signal with one of a plurality of first demodulation frequencies, and when configured in the spectrum analyzer mode, demodulating the noise signal with an in-phase (I) component or a quadrature (Q) component of one of a plurality of second demodulation frequencies.

17. The touch sensor panel subsystem of claim 14, each of the plurality of demodulators comprising:

a first mixer; and a first frequency source coupled to the first mixer;

wherein each first frequency source is configurable to generate a different demodulation frequency.

* * * * *